US008433916B2

(12) United States Patent
Kohavi

(10) Patent No.: US 8,433,916 B2
(45) Date of Patent: Apr. 30, 2013

(54) ACTIVE HIP

(75) Inventor: Ron Kohavi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 973 days.

(21) Appl. No.: 12/241,250

(22) Filed: Sep. 30, 2008

(65) Prior Publication Data

US 2010/0082998 A1    Apr. 1, 2010

(51) Int. Cl.
*G06F 21/00* (2006.01)
*G06F 15/16* (2006.01)
*H04L 9/00* (2006.01)
*H04L 1/00* (2006.01)

(52) U.S. Cl.
USPC ............. 713/182; 705/50; 380/265; 380/270; 726/7

(58) Field of Classification Search .......... 713/155–159, 713/168–174, 202; 709/225, 229; 726/2–8; 380/277–286
See application file for complete search history.

(56) References Cited

U.S. PATENT DOCUMENTS

| | | | |
|---|---|---|---|
| 7,337,324 B2 | 2/2008 | Benaloh et al. | |
| 2002/0176578 A1* | 11/2002 | LaPat et al. | 380/265 |
| 2005/0065802 A1 | 3/2005 | Rui et al. | |
| 2005/0246775 A1 | 11/2005 | Chellapilla et al. | |
| 2005/0278253 A1* | 12/2005 | Meek et al. | 705/50 |
| 2006/0095578 A1 | 5/2006 | Paya et al. | |
| 2007/0026372 A1 | 2/2007 | Huelsbergen | |
| 2007/0101010 A1 | 5/2007 | Ellison et al. | |
| 2007/0143624 A1 | 6/2007 | Steeves | |
| 2007/0234423 A1 | 10/2007 | Goodman et al. | |
| 2009/0150983 A1* | 6/2009 | Saxena et al. | 726/7 |

OTHER PUBLICATIONS

Oleg, "Smart Captcha", Retrieved at <<http://www.protectwebform.com/smartcaptcha>>, Oct. 8, 2006, pp. 2.
Elson, et al., "Asirra: A Captcha that Exploits Interest-Aligned Manual Image Categorization", Retrieved at <<http://naviguer.ca/naviguer/nph-naviguer.pl/000010A/http/research.microsoft.com/asirra/papers/CCS2007.pdf>>, CCS'07, Oct. 29-Nov. 2, 2007, Alexandria, VA, USA. pp. 9.

(Continued)

*Primary Examiner* — Ashok Patel
*Assistant Examiner* — Evans Desrosiers
(74) *Attorney, Agent, or Firm* — Zete Law, P.L.L.C.; MacLane C. Key

(57) ABSTRACT

Computing services that unwanted entities may wish to access for improper, and potentially illegal, use can be more effectively protected by using Active HIP systems and methodologies. An Active HIP involves dynamically swapping one random HIP challenge, e.g., but not limited to, image, for a second random HIP challenge, e.g., but not limited to, image. An Active HIP can also, or otherwise, involve stitching together, or otherwise collecting and including, within Active HIP software, i.e., a HIP web page, to be executed by a computing device of a user seeking access to a HIP-protected computing service x number of software executables randomly selected from a pool of y number of software executables. The x number of software executables, when run, generates a random Active HIP key. If the generated Active HIP key accompanies a correct user response to the valid HIP challenge the system and/or methodology can assume with a degree of certainty that the current user is a legitimate human user and allow the current user access to the requested computing service.

20 Claims, 13 Drawing Sheets

OTHER PUBLICATIONS

"Visual Flash Captcha—Completely Automated Public Turing Test to Tell Computers and Humans Apart", Retrieved at <<http://www.dracon.biz/captcha.php>>, Jun. 3, 2008, pp. 2.

"Microsoft Human Interaction Proof (HIP)", Retrieved at <<http://download.microsoft.com/download/3/2/0/320e814a-d969-4c6c-a26e-2f3115032d4c/Human_Interaction_Proof_Technical_Overview.doc>>, pp. 9.

Bromberg, Peter, "Toward Viable Captcha Alternatives", Retrieved at <<http://www.eggheadcafe.com/tutorials/aspnet/5b689df4-19db-4de6-b1ec-a34cd08623e8/toward-viable-captcha-alt.aspx>>, Jun. 3, 2008, pp. 5.

Chellapilla, et al., "Building Segmentation Based Human-friendly Human Interaction Proofs (HIPs)", Retrieved at <<http://research.microsoft.com/~kumarc/pubs/chellapilla_hip05.pdf>>, pp. 27.

"Captcha", Retrieved at <<http://en.wikipedia.org/wiki/Captcha>>, Jun. 2, 2008, pp. 5.

Ahn, et al., "Telling Humans and Computers Apart Automatically", Retrieved at <<http://www.captcha.net/captcha_cacm.pdf>>, Feb. 2004, vol. 47, No. 2, pp. 57-60.

Ahn, et al., "Captcha Using Hard AI Problems for Security", Retrieved at <<http://www.cs.cmu.edu/~biglou/captcha_crypt.pdf>>, pp. 18.

"Petmail Design", "Hire People to Solve Captcha Challenges", Retrieved at <<http://petmail.lothar.com/design.html>>, Jun. 2, 2008, pp. 18.

"Method for Selectively Restricting Access to Computer Systems (US Patent No. 6195698)", Retrieved at <<http://patft.uspto.gov/netacgi/nph-Parser?Sect1=PTO1&Sect2=HITOF...>>, Feb. 27, 2001, pp. 12.

Doctorow, Cory, "Solving and creating captchas with free porn", Retrieved at <<http://www.boingboing.net/2004/01/27/solving-and-creating.html>>, Jan. 27, 2004, pp. 3.

Goodman, et al.,"Stopping Outgoing Spam", Retrieved at <<http://research.microsoft.com/~joshuago/outgoingspam-final-submit.pdf>>, EC'04, May 17-20, 2004, New York, pp. 10.

"Captcha: Telling Humans and Computers Apart Automatically", Retrieved at <<http://www.captcha.net/>>, Jun. 2, 2008, pp. 4.

"The Captcha Project", Retrieved at <<http://www.captcha.net/cgi-bin/esp-pix>>, Jun. 2, 2008, p. 1.

Naor, Moni, "Verification of a Human in the Loop or Identification via the Turing Test", Retrieved at <<http://citeseer.ist.psu.edu/cache/papers/cs/1946/http:zSzzSzwww.wisdom.weizmann.ac.ilzSz~naorzSzPAPERSzSzhuman.pdf/naor96verification.pdf>>, Sep. 13, 1996, pp. 6.

"What is reCaptcha", Retrieved at <<http://recaptcha.net/learnmore.html>>, Jun. 2, 2008, pp. 2.

Taco, CMDR, "Will Solve Captcha for Money", Retrieved at <<http://it.slashdot.org/article.pl? sid=06/09/06/1217240>>, Sep. 6, 2006, pp. 15.

* cited by examiner

ACTIVE HIP

BACKGROUND

Human Interaction Proofs (HIPs), or Completed Automated Public Turing tests to tell Computers and Humans Apart (CAPTCHAs), referred to jointly herein as HIPs, are known solutions for allowing computers and computer-based devices, e.g., internet servers running a webmail, i.e., web-based email, service, hand-held devices, computer-based cell phones, etc., collectively referred to herein as computing devices, to attempt to distinguish between other computing devices running automated programs and humans. HIPs provide filters that are used to prevent automated programs from utilizing computing services intended for humans. Such automated scripts, if successful, have measureable negative effects on the computing service, whether due to abuse or resource expenditure.

In general HIPs are software programs that can generate and grade tests that humans can be expected to pass and automated computing device programs can be expected to fail, allowing a computing device system to differentiate between a human access and a computing device running automated programs, e.g., bots. Bots are software applications that run automated tasks over the internet, including, e.g., attempting to automatically open email accounts for unwarranted purposes such as disseminating SPAM emails and participating in voting or rating contests or activities to unduly influence the outcome, automatically open accounts on folder-shares for surreptitiously acquiring unwarranted disk space allocations, and automatically reserve high quantities of domains that can potentially be sold to legitimate companies for high prices.

While there are many HIP designs, reading-based HIP challenges are currently some of the most popularly implemented. The most commonly employed reading-based HIPs are composed of characters rendered to an image and distorted, or otherwise obfuscated, before being presented to a user. A user, whether human or computing device, must first identify all the characters in the HIP, in the correct order, before being granted access to the desired computing service.

The success rate is important for breaking, i.e., solving for unwarranted purposes, HIPs since it reduces the cost of automatic trials. HIPs, or HIP challenges, that are too difficult, or costly, for bots to break can be solved by forwarding the HIP to humans in countries where human labor is cheap. It is estimated that shipping via the internet, e.g., farming, HIPs to sweatshops, or Turing Farms, can currently reduce the costs of breaking HIPs to as low as sixty cents an hour, implying approximately 0.17 cents per HIP solution. Estimates today attest to humans around the world breaking approximately sixty million HIPs every day. And as humans are solving the HIPs there is no known unbreakable HIP challenge design that will still enable legitimate human users the ability to solve them and access the desired computing services.

Additionally, bots for breaking HIPs are becoming more technologically savvy and capable of increasingly breaking more HIPs. One known solution to combat smarter bots is to design the HIP challenges to be increasingly more difficult to solve. This solution, however, has the unfortunate, and unwanted, effect of generating HIPs that are becoming more difficult for legitimate humans to solve. Computing services that more regularly fail legitimate human attempted access will have decreased user satisfaction, and, commensurately, decreased use.

Thus, it would be desirable to design a system and methodology for implementing Active HIPs that will continue to allow legitimate human users quick and successful resolution to the problem displayed by the Active HIP. It would also be desirable for these Active HIPs to, at the same time, block bots and Turing Farms from easily and/or cost effectively breaking these same HIPs.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include systems and methodologies for Active Human Interactive Proof (HIP) implementation to protect computing services from unwanted and unwarranted access. In an embodiment HIP software, e.g., a HIP web page, executing on a computing device of a user attempting access to an Active HIP-protected computing service dynamically replaces a first HIP challenge, e.g., but not limited to, a first HIP image, with a second HIP challenge, e.g., but not limited to, a second HIP image.

Embodiments discussed herein also include Active HIP systems and methodologies that randomly and dynamically stitch, or otherwise collect or conflate, together various software executables, also referred to herein as HIP key codelets, that when run define a random, unique Active HIP key. In an embodiment the number of HIP key codelets randomly stitched together and obfuscated is designed to ensure that the resultant Active HIP key cannot be economically deciphered without executing the Active HIP software. In an embodiment the generated Active HIP key accompanies, or is otherwise associated with, any user response to a HIP challenge. In an embodiment execution of the Active HIP software, e.g., HIP web page, enables collection of information that can assist in identifying bots and Turing Farms while providing a degree of assurance for legitimate human user access attempts.

BRIEF DESCRIPTION OF THE DRAWINGS

These and other features will now be described with reference to the drawings of certain embodiments and examples which are intended to illustrate and not to limit the invention, and in which.

DETAILED DESCRIPTION

In the following description, for purposes of explanation numerous specific details are set forth in order to provide a thorough understanding of the present invention. It will be apparent, however, to one skilled in the art that the invention may be practiced without these specific details. In other instances well-known structures and devices are shown in block diagram form in order to avoid unnecessarily obscuring the invention. Any and all titles used throughout are for ease of explanation only and are not for use in limiting the invention.

Figure 1:
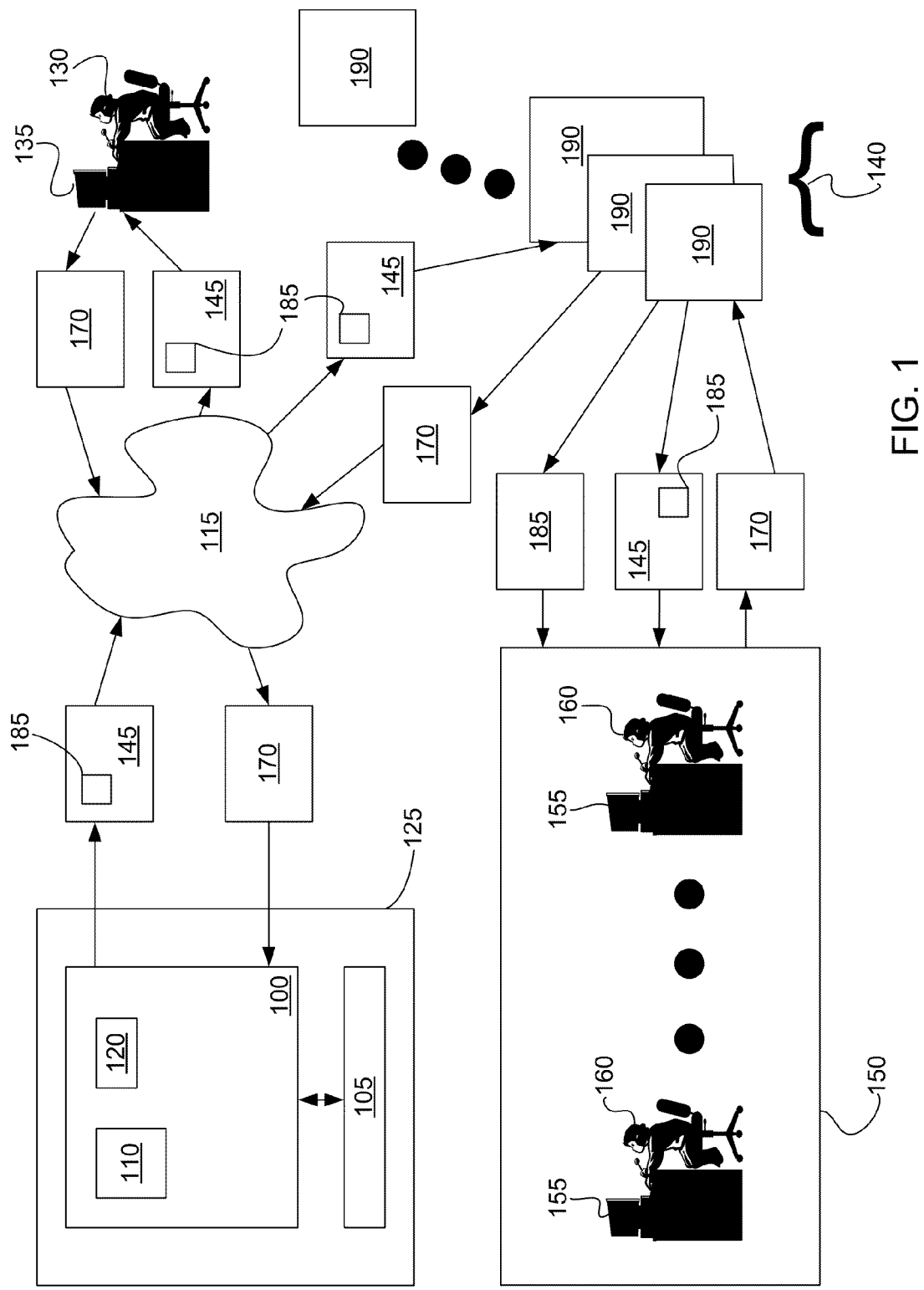
FIG. 1 depicts a known Human Interactive Proof (HIP) system that can be broken, or otherwise circumvented, by unwanted entities.

Referring to FIG. 1, in known HIP (Human Interactive Proof) systems, also referred to herein as a HIP, a computing service 105, e.g., a service from which an email account can be opened, protected by a HIP 100 executes on a server 125 connected to, or otherwise with access to, the internet 115. When a legitimate human user 130 desires to open an email account 105, the HIP 100 downloads, or otherwise makes accessible, HIP software, i.e., a HIP web page, 145 to the user's computing device 135. The HIP web page 145 includes a HIP challenge 185, or reference thereto. The HIP challenge 185 may be randomly selected from a pool of HIP challenges 110. Alternatively the HIP challenge 185 may be generated on the fly. The HIP challenge 185 is a problem, e.g., an obfuscated image, that the legitimate human user 130 must solve in order to gain access to the computing service 105, e.g., be provided a desired email account.

The HIP web page 145 displays, or otherwise provides, to a legitimate human user using the computing device 135 the randomly selected HIP challenge 185. The human user 130 thereafter submits a HIP response 170, e.g., a designation of the characters in the HIP image 185, in their correct order, via the internet 115, to the server 125 hosting, or otherwise supporting, the computing service 105. Decision software 120 of the HIP 100 determines whether a received HIP response is correct. If the HIP response 170 is a correct identification of the HIP challenge 185 the legitimate human user 130 is granted access to the computing service 105, e.g., is provided a new email account.

Entities with unwarranted intents, referred to herein as an unwanted entity or entities 140, can create and run automated software program(s), e.g., bot(s), on one or more servers 190 for breaking the HIP 100 and gaining access to the computing service 105. Generally the unwanted entities' bots do not execute the HIP web page 145 but merely search the HIP web page 145 for the HIP challenge 185. Once the HIP challenge 185 is located, the bots running on the servers 190 may automatically solve the HIP challenge 185, e.g., identify the obfuscated image using optical recognition software, and submit a correct HIP response Alternatively, bot(s) running on the servers 190 may forward the HIP challenge 185 to the computing device 155 of a human 160 working at a Turing Farm 150. The Turing Farm human 160 may solve the HIP challenge 185 and return a HIP response 170, e.g., a designation of the characters in the HIP image, in their correct order, to a server 190 of the unwanted entity 140. The unwanted entity server 190, in turn, submits the HIP response 170 to the server 125 hosting, or otherwise supporting, the computing service 105 via the internet 115. Again, as the submitted HIP response 170 is correct the unwanted entity 140 is granted access to the computing service 105.

In other systems bot(s) running on the servers 190 may forward the entire HIP web page 145 to a Turing Farm computing device 155. A Turing Farm human 160 reviews the HIP web page 145 looking for the HIP challenge 185. If located, the Turing Farm human 160 may solve the HIP challenge 185 and return a HIP response 170 to a server 190 of the unwanted entity 140. The unwanted entity server 190, in turn, submits the HIP response 170 to the server 125 hosting, or otherwise supporting, the computing service 105 via the internet 115. If the submitted HIP response 170 is correct the unwanted entity 140 is granted access to the computing service 105.

Figure 2:
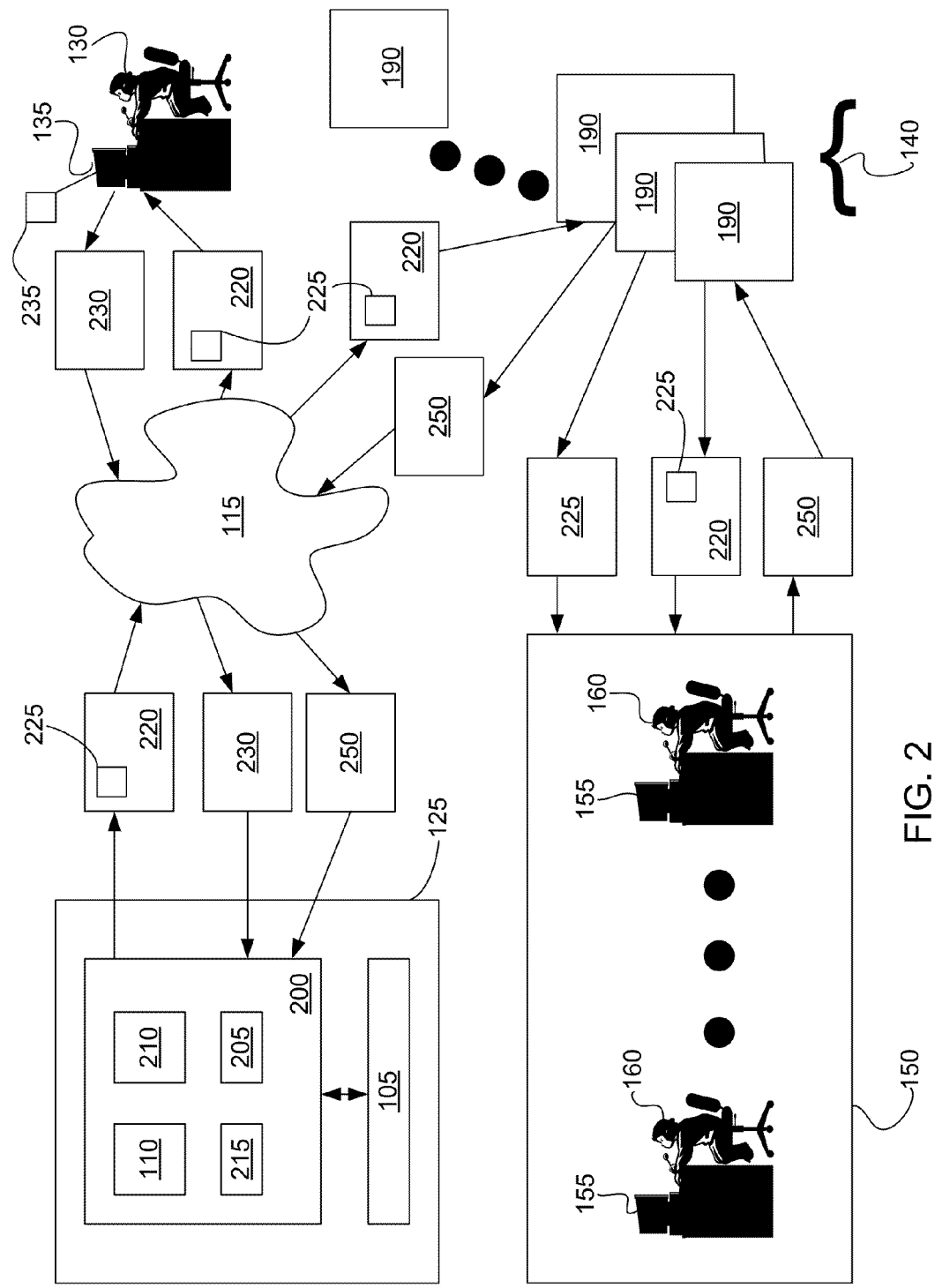
FIG. 2 depicts an embodiment Active HIP system involving dynamically replaceable HIP challenges.

In an embodiment Active HIP code, e.g., JavaScript® software, Flash® software, Silverlight® software, etc., implementing an Active HIP dynamically replaces, or alternatively modifies, the HIP challenge presented to a user for resolution. Referring to FIG. 2, in an Active HIP embodiment a computing service 105 is protected by a HIP system 200, also referred to as an Active HIP 200, which dynamically replaces, or alternatively modifies, the HIP challenge to be solved. When a legitimate human user 130 desires to access the computing service 105, e.g., open an email account, the Active HIP 200 downloads, or otherwise makes accessible, HIP software, e.g., a HIP web page, 220 to the user's computing device 135. In an embodiment the HIP web page 220 includes a first identified, or obtained, HIP challenge 225, or reference thereto.

In an embodiment a HIP challenge generator 215, i.e., software, of the Active HIP 200 randomly selects a first HIP challenge 225 from a first pool of HIP challenges 110. In an alternative embodiment the HIP challenge generator 215 contemporaneously generates a first random HIP challenge 225.

In an embodiment the first HIP challenge 225 is a problem, or puzzle, e.g., an obfuscated image. In alternative embodiments other first HIP challenges can be used, e.g., but not limited to, a first HIP audio stream, where the user is expected to respond with a typed version of what they heard in the first HIP audio stream, a first HIP sentence, where a user is expected to respond by submitting a missing word, or words, for the first HIP sentence, a first HIP image, or collection of images, containing one or more animals, or other items, to be identified, etc.

In an embodiment the HIP web page 220 executing, or otherwise enabled, on the computing device 135 of the legitimate human user 130 dynamically replaces the first HIP challenge 225, or reference thereto, with a second HIP challenge 235, or reference thereto. In an embodiment the second HIP challenge 235 is identified, or otherwise obtained, by the HIP challenge generator 215. In an aspect of this embodiment the second HIP challenge 235 is randomly selected by the HIP challenge generator 215 from the first pool of HIP challenges 110. In an alternative aspect of this embodiment the second HIP challenge 235 is randomly selected by the HIP challenge generator 215 from a second pool of HIP challenges 210. In a second alternative aspect of this embodiment the HIP challenge generator 215 contemporaneously generates, i.e., generates on the fly, the second HIP challenge 235 during execution of the HIP web page 220. In a third alternative aspect of this embodiment the HIP challenge generator 215 of the HIP web page 220 executing, or otherwise enabled, on the computing device 135 of the legitimate human user 130 dynamically modifies the first HIP challenge 225, or reference thereto, to a second HIP challenge 235, or reference thereto.

In an embodiment the second HIP challenge 235 is a problem, or puzzle, e.g., and obfuscated image, that the legitimate human user 130 must solve to gain access to the computing service 105. In alternative embodiments other second HIP challenges can be used, e.g., but not limited to, a second HIP audio stream, where the user is expected to respond with a typed version of what they heard in the second HIP audio stream, a second HIP sentence, where a user is expected to respond by submitting a missing word, or words, for the second HIP sentence, a second HIP image, or collection of images, containing one or more animals, or other items, to be identified etc.

The HIP web page 220 displays, or otherwise provides, the second HIP challenge 235 to the human user 130. The human user 130 thereafter submits a HIP response 230, e.g., a designation of the characters in the second HIP image 235, in their correct order, via the internet 115 to the server 125 hosting, or otherwise supporting, the computing service 105. Decision software, also referred to as a determinator, 205 of the Active HIP 200 determines whether a received HIP response is correct. If the HIP response 230 is a correct identification of the second HIP challenge 235 the legitimate human user 130 is granted access to the computing service 105, e.g., is provided a new email account.

In an embodiment the original, first, HIP challenge 225 is tagged with a globally unique identifier, GUID, such as, but not limited to, a number associated with the filename of the first HIP challenge 225. In an embodiment the GUID is sixty-four (64) bits. In other embodiments the GUID can be other bit lengths. In an embodiment the GUID associated with the first HIP challenge 225 is used by the HIP web page 220 to dynamically replace the first HIP challenge 225 with a second HIP challenge 235 for the user 130 to solve. In an alternative embodiment the GUID associated with the first HIP challenge 225 is used by the HIP web page 220 to dynamically modify the first random HIP challenge 225 to a second random HIP challenge 235 for the user 130 to solve.

In an embodiment the code implementing the Active HIP 200 can be obfuscated from breakage by interleaving code segments of the HIP web page 220 that is downloaded, or otherwise made available, to the user's computing device 135.

In an embodiment the unwanted entities' bots executing on the unwanted entities' servers 190 will search the HIP web page 220 for the HIP challenge 225. As the unwanted entities' bots are not executing the HIP web page 220, but merely searching it for the HIP challenge to be solved, the HIP web page 220 will not execute and dynamically replace the first HIP challenge 225 with a second HIP challenge 235, or alternatively modify the first HIP challenge 225 to a second HIP challenge 235. In this scenario and embodiment the unwanted entities' bots may find the first HIP challenge 225, or reference thereto, and if capable, automatically solve the first HIP challenge 225 and submit a HIP response 250 to the server 125 hosting, or otherwise supporting, the computing service 105 via the internet 115. In this embodiment and scenario the submitted HIP response 250 will be incorrect because it is only a correct interpretation of the first HIP challenge 225 and not a correct interpretation of the second HIP challenge 235. Decision software 205 of the Active HIP 200 determines a correct response for the first HIP challenge 225 has been sent, but an incorrect response for the second HIP challenge 235 has been sent, and the unwanted entity 140 fails the Active HIP 200.

In an alternative scenario of this embodiment a bot running on an unwanted entity server 190 may forward the first HIP challenge 225 to the computing device 155 of a human 160 working at a Turing Farm 150. The Turing Farm human 160 may solve the first HIP challenge 225 and return a HIP response 250, e.g., a designation of the characters in the first In another alternative scenario of this embodiment, a bot running on a server 190 may forward, or otherwise make available, the HIP web page 220, including the reference to the first HIP challenge 225, to a Turing Farm computing device 155. A Turing Farm human 160 reviews the HIP web page 220 looking for the HIP challenge. As the Turing Farm computing device 155 is not executing the HIP web page 220, the first HIP challenge 225 is not dynamically replaced by, or alternatively modified to, a second HIP challenge 235. Thus, the Turing Farm human 160 will locate, if any, the first HIP challenge 225, and, if capable, solve this first HIP challenge 225. Thereafter, a HIP response 250 to the first HIP challenge 225 is returned to an unwanted entity server 190. The unwanted entity server 190, in turn, submits the HIP response 250 to the server 125 hosting, or otherwise supporting, the computing service 105. Decision software 205 of the Active HIP 200 determines a correct response for the first HIP challenge 225 has been sent but an incorrect response for the second HIP challenge 235 has been sent and the unwanted entity 140 fails the Active HIP 200.

If the submitted HIP response 250 from an unwanted entity 140 is a correct resolution of the first HIP challenge 225 the Active HIP 200 can determine with a degree of certainty that an unwanted entity 140 is attempting to gain unwarranted access to the computing service 105. In an aspect of this embodiment in this scenario the Active HIP 200 denies the unwanted entity 140 access to the computing service 105. In an alternative aspect of this embodiment in this scenario the Active HIP 200 allows the unwanted entity 140 access to the computing service 105 and thereby attempts to gather information about the unwanted entity 140, e.g., time zone, location, date of execution, time of day of execution, IP address, machine id, etc. In this alternative aspect of this embodiment any such gathered information can be used to, e.g., deny computing device(s) of the unwanted entity 140 any future access to the computing service 105, etc.

As noted, in a scenario of this embodiment an unwanted entity's server 190 may forward the HIP web page 220 to a Turing Farm 150 for resolution. In an aspect of this embodiment in this scenario the Active HIP 200 can identify inconsistency(ies) between the identity of the unwanted entity server 190 that originally accessed the Active HIP 200 and the identity of the Turing Farm computing device 155 that ultimately provides a solution for the first HIP challenge 225. In an aspect of this embodiment any inconsistencies noted are used to determine that an unwanted entity 140 is attempting access to the computing service 105. In an aspect of this embodiment in this scenario the Active HIP 200 may take appropriate action, e.g., deny the unwanted entity 140 any future access to the computing service 105, etc.

In an aspect of this embodiment, if an unwanted entity server 190 or a Turing Farm computing device 155 provides solutions to more than a predetermined number of HIP challenges for access to the computing service 105 the Active HIP 200 identifies the respective server 190 or Turing Farm computing device 155 as a component of an unwanted entity 140. In an aspect of this embodiment in this scenario the Active HIP 200 may take appropriate action, e.g., deny the unwanted entity 140 any further access to the computing service 105, etc.

Figure 3:
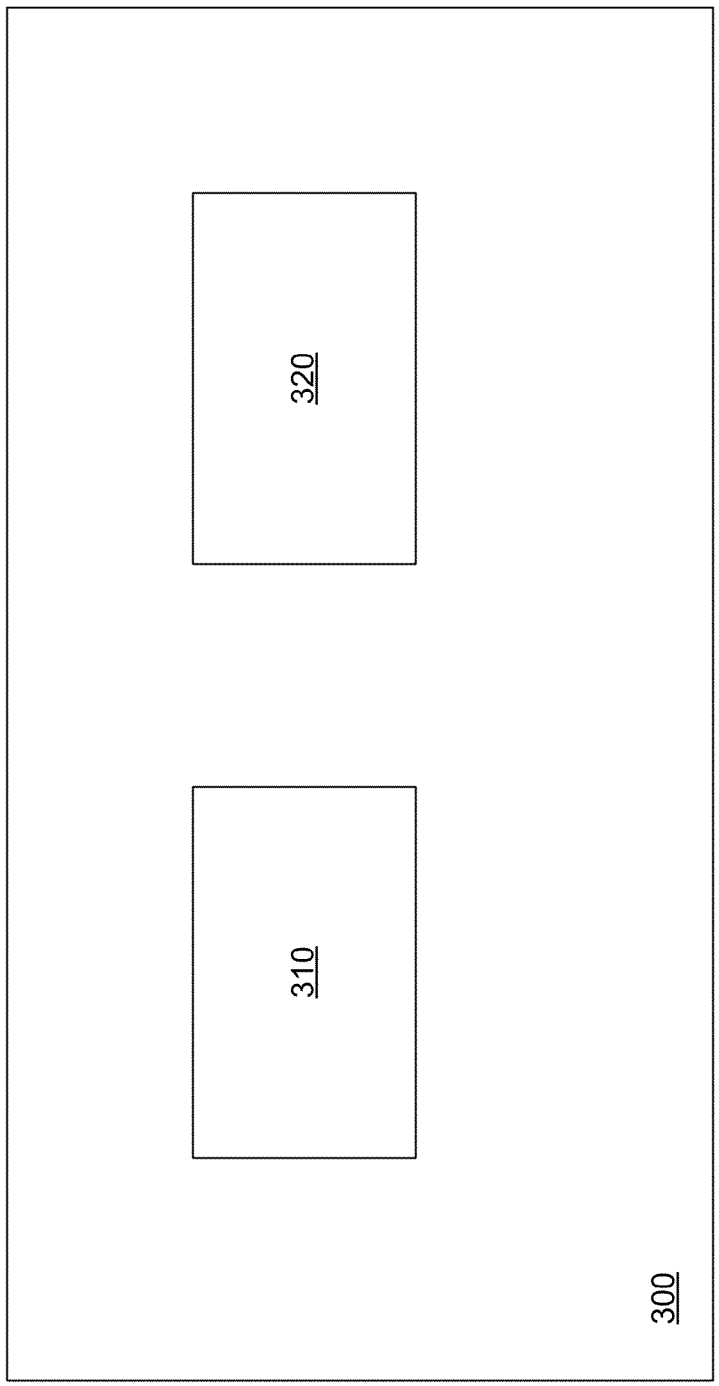
FIG. 3 depicts an exemplary embodiment interactive screen for assistance in determining whether a current user access attempt should be allowed.

In an embodiment, if the Active HIP 200 determines a potential unwanted entity 140 is attempting access to the computing service 105, the HIP web page 220 posts an interactive window 300, an embodiment of which is shown in FIG. 3, indicating fraud is suspected. In an embodiment the interactive window 300 contains a first button 310, or other input device, which a user, legitimate or otherwise, is requested to click, or otherwise activate, to report a computing service access attempt as fraud. In an embodiment the interactive window 300 contains a second button 320, or other input device, which a user, legitimate or otherwise, can click, or otherwise activate, to potentially gain access to the computing service 105.

In an aspect of this embodiment the user who clicks, or otherwise activates, the second button 320, or other second input device, is only granted access to the desired computing service 105, if at all, by first providing the Active HIP 200 user information, e.g., identity, location, etc. In this embodiment aspect the information provided is used to resolve the issues associated with a legitimate user's seemingly unwarranted attempt to gain access to the computing service 105. In this embodiment aspect the collected information is used to identify unwanted entities 140 that are making unwarranted access attempts for the computing service 105.

In this embodiment unwanted entity bots can be expected to be unsuccessful in understanding and correctly navigating the interactive window 300. In an aspect of this embodiment upon no response to the interactive window 300 within a predefined time limit the Active HIP 200 determines that an unwanted entity 140 is attempting access to the computing service 105.

Turing Farm humans 160 generally will not see the interactive window 300 as their computing devices 155 are typically not executing the HIP web page 220. Even if a Turing Farm computing device 155 does execute the HIP web page 220, or the portion that produces the interactive window 300, Turing Farm humans 160 may choose not to interact with the interactive window 300 or be instructed not to engage in such interaction. In an aspect of this embodiment, upon no response to the interactive window 300 within a predefined time limit the Active HIP 200 determines that an unwanted entity 140 is attempting access to the computing service 105.

Figure 4A:
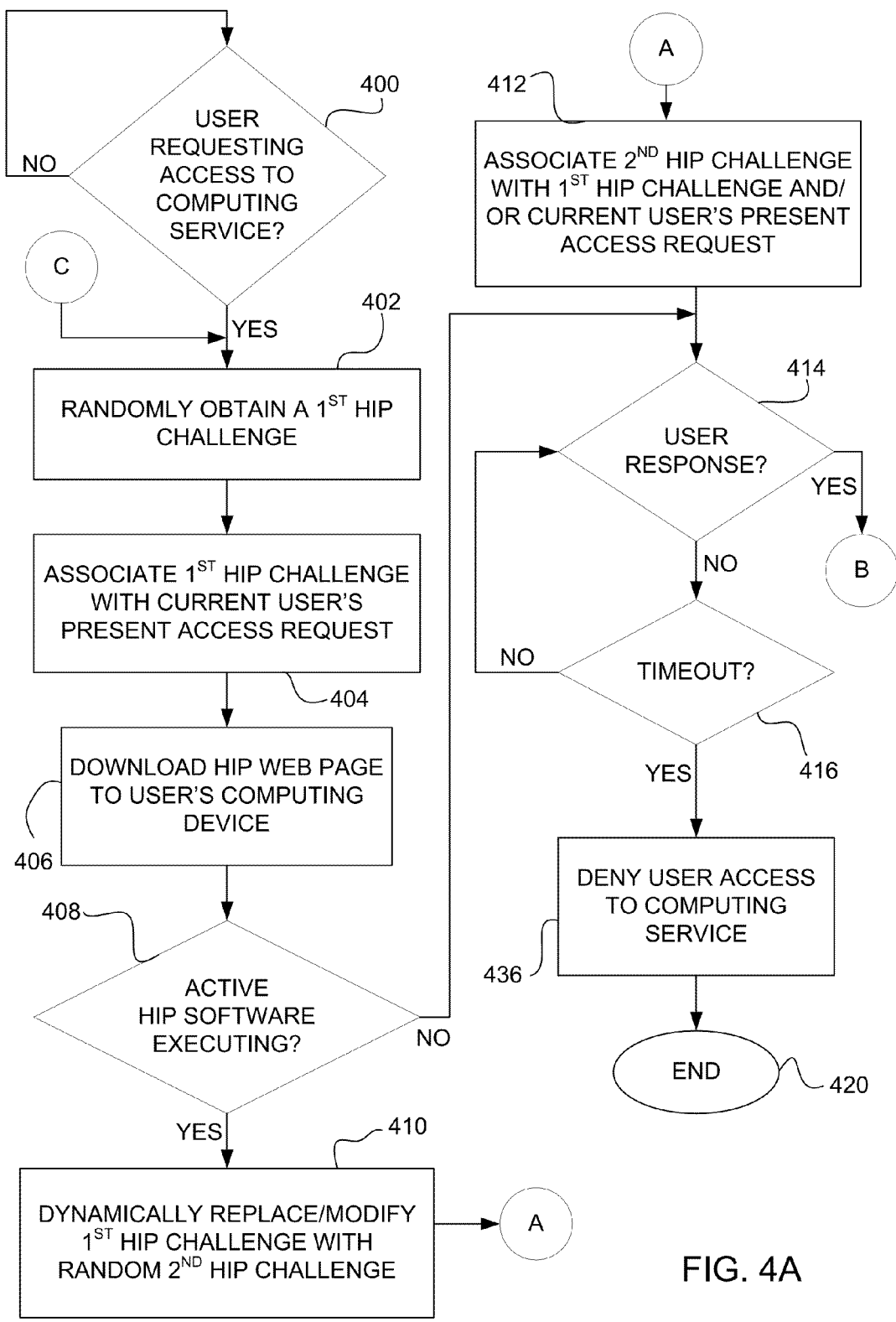
FIGS. 4A-4C illustrate an embodiment logic flow for an Active Human Interaction Proof (HIP) involving dynamically replaceable HIP challenges.
Figure 4B:
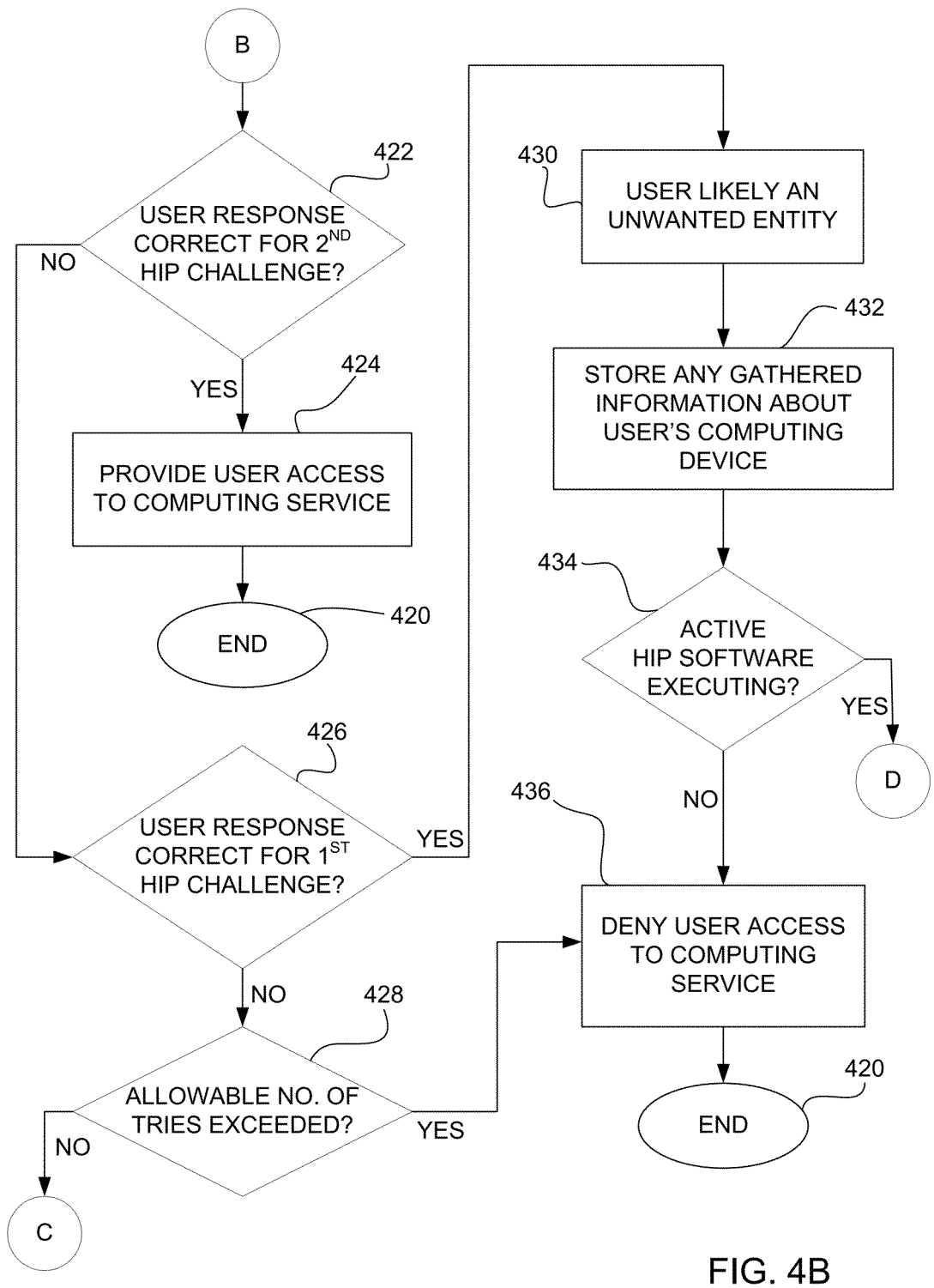
Figure 4C:
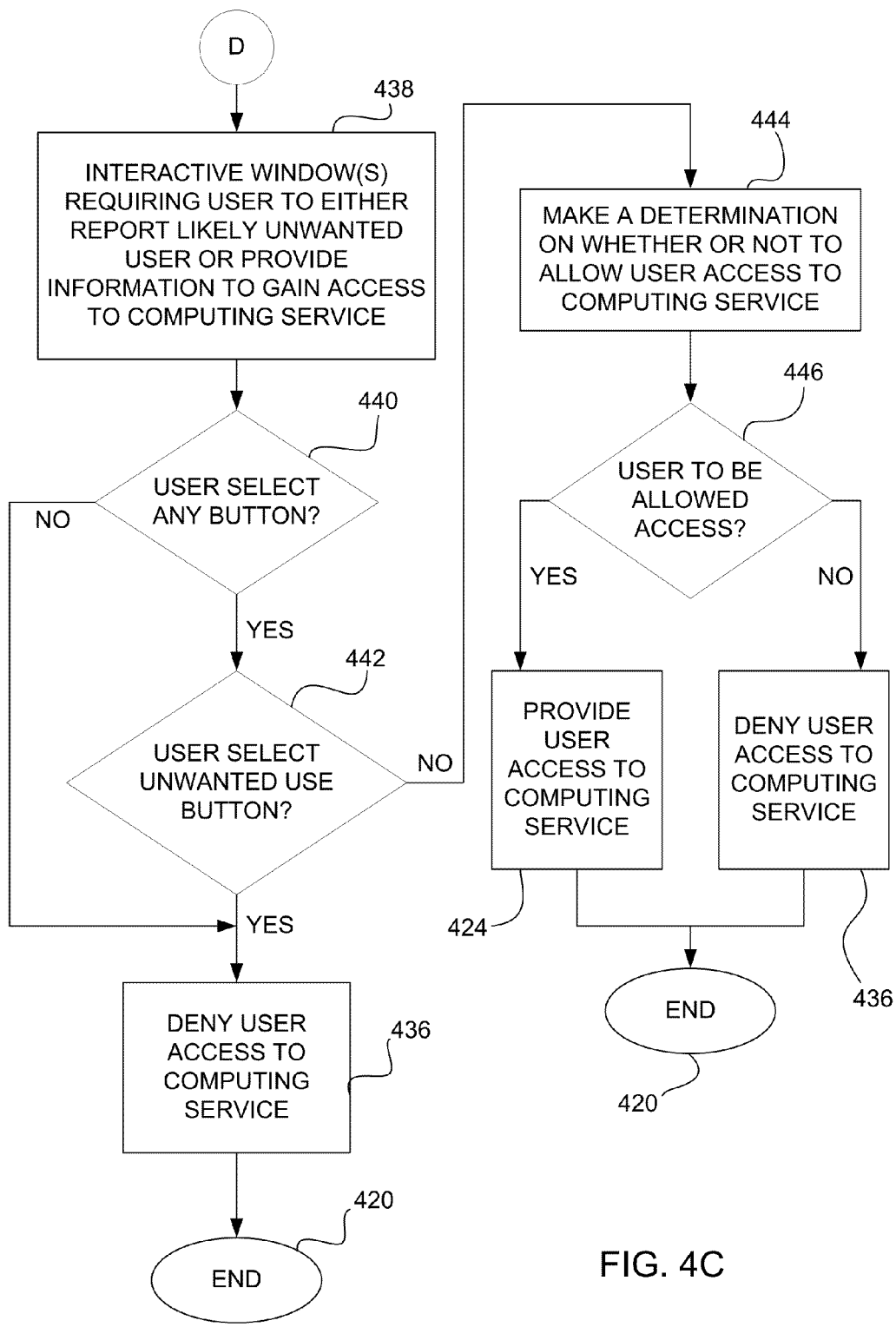

FIGS. 4A, 4B and 4C illustrate an embodiment logic flow for implementing an Active HIP system involving dynamically replacing HIP challenges, or alternatively modifying a HIP challenge, to distinguish between legitimate and unwarranted user access to a computing system. While the following discussion is made with respect to systems portrayed herein the operations described may be implemented in other systems. Further, the operations described herein are not limited to the order shown. Additionally, in alternative embodiments more or fewer operations may be performed.

Referring to FIG. 4A, a determination is made as to whether a user, human or otherwise, is requesting access to a computing service protected by an embodiment Active HIP 400. If no, the system continues to loop waiting for a user access request. If, however, a user is requesting access to the computing service, in an embodiment a first HIP challenge is randomly obtained, or otherwise identified, by a HIP challenge generator 402.

In an embodiment the HIP challenge generator is software that randomly selects the first HIP challenge from a pool, or other collection, of available HIP challenges 402. In an aspect of this embodiment the first HIP challenge randomly selected is obfuscated 402, i.e., distorted or otherwise manipulated and/or changed in such a manner that will generally make it difficult, if not impossible, for an automated computer program, e.g., a bot, to solve the first HIP challenge while still allowing a human user to be able to correctly solve the first HIP challenge. In an alternative aspect of this embodiment the pool, or other collection, of available HIP challenges from which the first HIP challenge is randomly selected are challenges, or puzzles, e.g., images, which have already been obfuscated and are associated with a correct identification of their respective challenge. In a second alternative aspect of this embodiment the pool of HIP challenges from which the first HIP challenge is randomly selected are not obfuscated and require no obfuscation, e.g., the pool of HIP challenges are sets of figures and a user is required to identify a subset of a set of figures presented to them.

In an alternative embodiment the HIP challenge generator identifies, or otherwise obtains, a first HIP challenge by randomly generating, or otherwise creating or assembling, on the fly, i.e., contemporaneously, the first HIP challenge 402. In an aspect of this alternative embodiment the first HIP challenge is obfuscated at the time it is randomly generated 402. In an alternative aspect of this alternative embodiment the first HIP challenge is obfuscated after it is randomly generated 402. In a second alternative aspect of this alternative embodiment the first HIP challenge is not obfuscated and requires no obfuscation.

In an embodiment the first HIP challenge is associated with the current user's present access request 404, e.g., is associated with the current user's computing device and/or access session, etc.

In an embodiment HIP software, e.g., a HIP web page, is downloaded, or otherwise provided, to the user's computing device 406.

In an embodiment, upon the HIP web page executing, or otherwise being enabled, 408 on the user's computing device, the first HIP challenge is dynamically replaced with a second HIP challenge 410. In an embodiment the HIP challenge generator randomly selects the second HIP challenge from a pool, or other collection, of available HIP challenges 410. In an aspect of this embodiment the second HIP challenge randomly selected is obfuscated 410, i.e., distorted or otherwise manipulated and/or changed in such a manner that will generally make it difficult, if not impossible, for an automated computer program, e.g., a bot, to correctly solve the second HIP challenge while still allowing a human user to be able to correctly solve the second HIP challenge. In an alternative aspect of this embodiment the pool, or other collection, of available HIP challenges from which the second HIP challenge is randomly selected are challenges, or puzzles, e.g., images, which have already been obfuscated and are associated with a correct identification of their respective challenge. In a second alternative aspect of this embodiment the pool of HIP challenges from which the second HIP challenge is randomly selected are not obfuscated and require no obfuscation, e.g., the pool of HIP challenges are sets of figures and a user is required to identify a subset of a set of figures presented to them In an embodiment the pool, or other collection, of available HIP challenges from which a second HIP challenge is randomly selected is the same as the pool of available HIP challenges from which the first HIP challenge is randomly selected. In an alternative embodiment the pool, or other collection, of available HIP challenges from which a second HIP challenge is randomly selected is different from the pool of available HIP challenges from which the first HIP challenge is randomly selected.

In an alternative embodiment the HIP challenge generator randomly identifies, or otherwise obtains, the second HIP challenge by generating, or otherwise creating or assembling, the second HIP challenge on the fly, i.e., contemporaneously, 410. In an aspect of this alternative embodiment the second HIP challenge is obfuscated at the time it is randomly generated. In an alternative aspect of this alternative embodiment the second HIP challenge is obfuscated after it is randomly generated. In a second alternative aspect of this alternative embodiment the second HIP challenge is not obfuscated and requires no obfuscation.

In another alternative embodiment, upon the HIP web page executing, or otherwise being enabled, 408 on the user's computing device, the first HIP challenge is dynamically modified to a random second HIP challenge 410.

In an embodiment the second HIP challenge is associated with the first HIP challenge 412. In another embodiment the second HIP challenge is associated with the current user's present access request 412, e.g., is associated with the current user's computing device and/or access session, etc. In still another embodiment the second HIP challenge is associated with both the first HIP challenge and the current user's present access request 412.

At decision block 414 a determination is made as to whether the current user has provided a response for a HIP challenge. If the user is a legitimate human user and the Active HIP web page is executing on their computing device then this human user is expected to provide a response to the second HIP challenge. Alternatively, if the user is an unwanted entity, either automated software code, e.g., a bot, or a human user working at a Turing Farm, the Active HIP web page is likely not executed on their respective computing device and the unwanted entity can be expected to provide a response, if any, to the first HIP challenge.

If at decision block 414 it is determined that no response has been provided for a HIP challenge, then in an embodiment at decision block 416 a determination is made as to whether a preset time limit has expired. If a preset time limit has expired with no response being sent for a HIP challenge, then in an embodiment the user is not granted access to the computing service 436 and the Active HIP processing ends 420. Otherwise, if the preset time limit has not expired the system continues to either wait for a response to a HIP challenge 414 or for the time limit to expire 416.

If the current user provides a response to a HIP challenge before the preset time limit expires then, referring to FIG. 4B, at decision block 422 a determination is made as to whether the user response is correct for the second HIP challenge. If yes, in an embodiment the user is assumed to be a legitimate human user who has successfully executed the Active HIP and is granted access to the computing service 424. Active HIP processing then ends 420.

If at decision block 422 it is determined that the current user did not provide a correct response for the second HIP challenge then at decision block 426 a determination is made as to whether the current user provided a correct response to the first HIP challenge. If no, in an embodiment a determination is made that the user may be a legitimate human user who was unable to solve the second HIP challenge. In this scenario, in an embodiment at decision block 428 a determination is made as to whether a preset allowable number of HIP tries has already occurred. If the user, legitimate or unwanted, has failed a preset number of attempts at successfully responding to second HIP challenges then in an embodiment the user is denied access to the relevant computing service 436 and Active HIP processing ends 420.

If however, the current user has not already used all their tries at successfully responding to the Active HIP web page then, referring again to FIG. 4A, the Active HIP again randomly identifies, or otherwise obtains, a first HIP challenge 402.

Referring back to decision block 426, if it is determined that the current user has successfully responded to the first HIP challenge in an embodiment the user is identified as an unwanted entity who has not executed the HIP web page 430. In an embodiment any information gathered from the unwanted entity computing device is stored 432.

In an embodiment, if the HIP web page is not executing on the current user's computing device 434 an assumption is that the current user is an unwanted entity and the current user is denied access to the relevant computing service 436. The Active HIP processing is terminated 420.

In an embodiment, if the HIP web page is executing on the current user's computing device 434 and the current user has provided a correct response to the first HIP challenge, an assumption is that either a human at a Turing Farm solved the first HIP challenge or an automated bot has infected an otherwise legitimate human user's computing device and is thereby attempting to gain unwarranted access to the computing service. In either instance, in an embodiment as shown in FIG. 4C the Active HIP displays, or otherwise provides, an interactive window(s) on the current user's computing device display, e.g., a monitor, etc., if there is a display 438. In an embodiment the interactive window(s) requests the current user to, via screen buttons, or other input mechanisms, either report a likely unwarranted attempted access to the computing service or provide user information, e.g., identity, location, etc., to be allowed access to the desired computing service 438.

In an embodiment at decision block 440 a determination is made as to whether the current user selected any screen button, or otherwise provided any required window response, within a predefined time limit. If no, an assumption is that the current user is an unwanted entity. In this scenario and embodiment the current user is denied access to the relevant computing service 436 and the Active HIP terminates processing 420.

If at decision block 440 it is determined that the user did provide a response then at decision block 442 a determination is made as to whether the user selected the window button, or otherwise identified, that the current access attempt is likely unwarranted. If yes, an assumption is that an unwanted entity is attempting access to the computing service and the current user is denied access to the computing service 436. In this scenario and embodiment Active HIP processing is terminated 420.

If, however, it is determined that the current user indicated via the interactive window that the present computing service access is legitimate then in an embodiment the Active HIP makes a determination on whether to allow the current user access to the computing service 444. In an embodiment the Active HIP makes a determination on whether to allow the current user access based on user information provided by the user via the interactive window(s) 444. In an embodiment in this scenario the current user may be provided access to the computing service although the user is a suspected unwanted entity in order to, among other reasons, potentially have the opportunity to interact with and learn more about the current user for future use in handling the current user's unwarranted access attempts to the computing service.

At decision block 446 if the determination has been made to allow the current user access then the current user is provided access to the relevant computing service 424 and the Active HIP processing is terminated 420. Alternatively, at decision block 446 if the determination has been made to deny the current user access the current user is denied access to the relevant computing service 436 and the Active HIP processing is terminated 420.

In an embodiment Active HIP code, e.g., JavaScript® software, Flash® software, Silverlight® software, etc., implementing an Active HIP dynamically generates a random bit string, hereinafter referred to as an Active HIP key, that must be associated with the solution to a HIP challenge in order for a user to gain legitimate access to a computing service protected by the Active HIP. In an aspect of this embodiment the Active HIP key is forty (40) bits of a dynamically generated random combination of ones and zeros. In other aspects of this embodiment the generated Active HIP key can be other lengths.

In an embodiment there are eighty (80) different code segments, hereinafter referred to as HIP key codelets, each responsible for generating one (1) bit of an Active HIP key. In an aspect of this embodiment forty (40) different, unique, HIP key codelets each generate a zero bit, i.e., a bit with a zero (0) value, for an Active HIP key. In an aspect of this embodiment an additional forty (40) different, unique, HIP key codelets each generate a one bit, i.e., a bit with a one (1) value, for an Active HIP key.

In alternative embodiments there can be other numbers and/or combinations of unique HIP key codelets responsible for generating one or more bits of an Active HIP key.

In an embodiment an Active HIP for protecting a computing service dynamically stitches together, or otherwise combines, forty (40) random HIP key codelets from the set of eighty (80) different HIP key codelets and associates the resultant HIP key codelet combination with the HIP challenge to be solved.

In other embodiments the Active HIP for protecting a computing service dynamically stitches together, or otherwise combines, other numbers and/or combinations of random HIP key codelets and associates the resultant HIP key codelet combination with the HIP challenge to be solved.

In aspects of these embodiments code implementing the Active HIP is obfuscated from breakage by interleaving the HIP key codelets for generating a particular random Active HIP key.

In alternative embodiments Active HIP keys are other entities that can be created by the random association of randomly generated software codelets, e.g., images randomly constructed from codelets that generate random pixel groups, sentences constructed from randomly associated words, etc.

Figure 5:
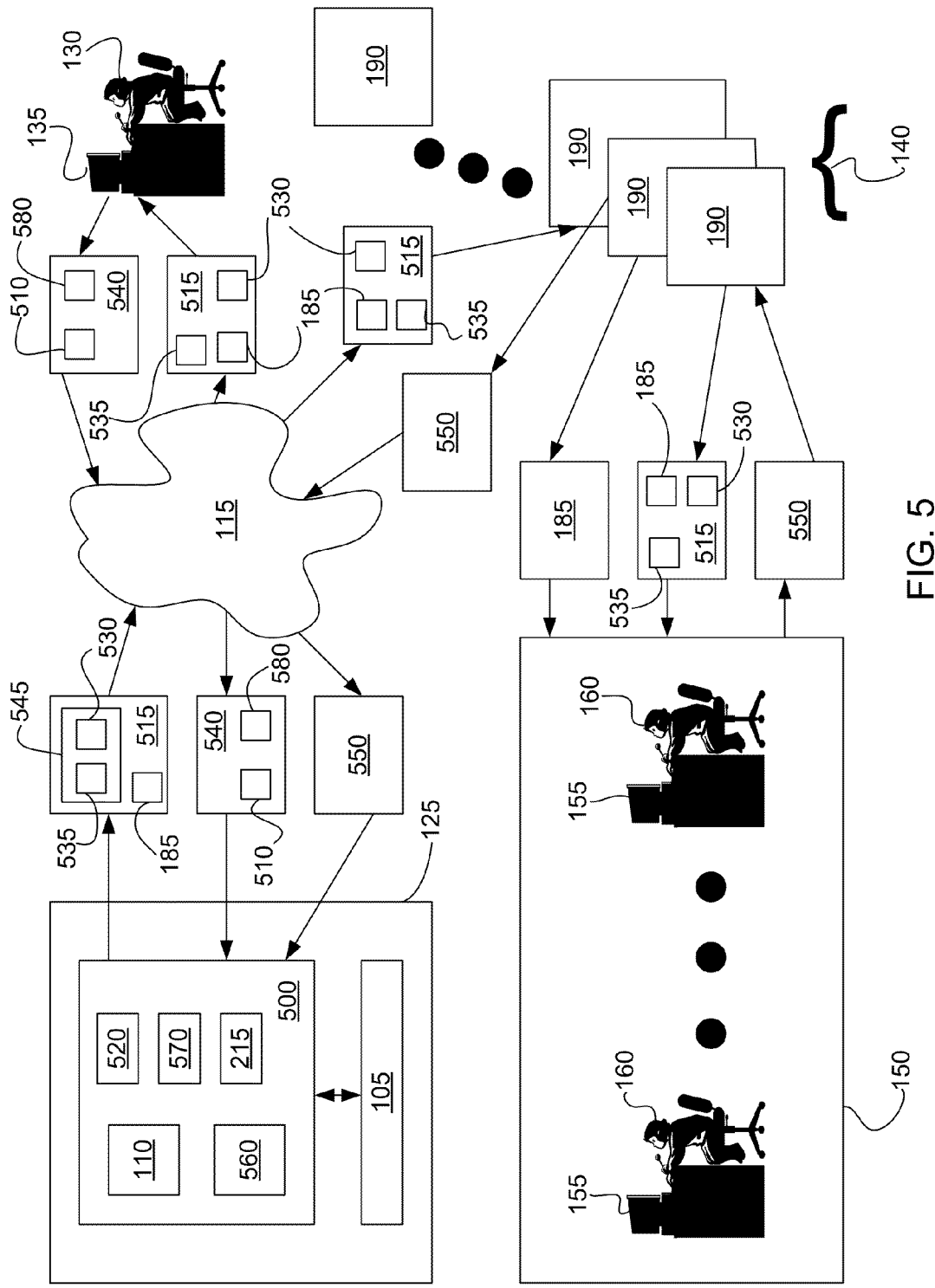
FIG. 5 depicts an embodiment Active HIP system involving dynamically generated random Active HIP keys.

Referring to FIG. 5, in an embodiment a computing service 105, e.g., for use in opening an email account, is protected by an Active HIP 500 that dynamically combines a group of HIP key codelets 530 randomly selected from a pool of HIP key codelets 560. In an aspect of this embodiment there are forty (40) HIP key codelets in the group 530 randomly selected from a pool of eighty (80) HIP key codelets 560. When executed the group of HIP key codelets 530 generates a random Active HIP key 510.

When a legitimate human user 130 desires to access the computing service 105, e.g., open an email account 105, the embodiment Active HIP 500 downloads, or otherwise makes accessible, HIP software, e.g., a HIP web page, 515 to the user's computing device 135. In an embodiment the HIP web page 515 includes, or otherwise references, a HIP challenge 185 identified, or otherwise obtained, by a HIP challenge generator 215. In an embodiment the HIP challenge generator 215 is software that includes, or otherwise accesses, a pool of HIP challenges 110 from which the HIP challenge 185 is randomly selected. In an alternative embodiment the HIP challenge generator 215 contemporaneously generates the HIP challenge 185.

In an embodiment the HIP challenge 185 is a problem, or puzzle, e.g., an obfuscated image, that the legitimate human user 130 must solve in order to gain access to the computing service 105, e.g., be provided a desired email account. The HIP web page 515 executes on the computing device 135 of the legitimate human user 130 and displays, or otherwise provides, the randomly selected HIP challenge 185 to the human user 130. The legitimate human user 130 thereafter submits a HIP response 540, e.g., a designation of the characters in the HIP image 185, in their correct order, via the internet 115 to the server 125 hosting, or otherwise supporting, the computing service 105.

In an embodiment the HIP web page 515 executing on the legitimate user's computing device 135 runs the group of randomly selected HIP key codelets 530 and generates a random Active HIP key 510. In an embodiment the Active HIP key 510 accompanies, or is otherwise associated with, the HIP response 540 from the legitimate user 130. Decision software, also referred to as a determinator, 520 of the embodiment Active HIP 500 determines whether a received HIP response is correct and is accompanied by, or otherwise associated with, a correct Active HIP key 510. In an embodiment, if the HIP response 540 is a correct identification of the HIP challenge 185 and is accompanied by, or otherwise associated with, the correct Active HIP key 510 the legitimate human user 130 is granted access to the computing service 105, e.g., is provided a new email account.

As noted, unwanted entities' bots running on unwanted entities' servers 190 do not execute HIP software, e.g., HIP web pages, 515 downloaded, or otherwise made accessible to them, but merely search the HIP web page 515 for the HIP challenge 185 to be solved. In an alternative scenario of this embodiment, once a bot identifies the HIP challenge 185 the bot may automatically solve the HIP challenge 185 and submit a HIP response 550 to the server 125 hosting, or otherwise supporting, the computing service 105 via the internet 115.

In this embodiment and scenario the submitted HIP response 550 will be incorrect because while it may contain a correct solution for the HIP challenge 185, it will fail to contain, or otherwise accompany or be associated with, any Active HIP key. Decision software 520 of the embodiment Active HIP 500 determines it has received a correct response for the HIP challenge 185 but that the HIP response 550 failed to be accompanied by, or otherwise associated with, the correct Active HIP key 510 and the unwanted entity 140 fails the Active HIP 500.

In an alternative scenario of this embodiment a bot running on a server 190 of an unwanted entity 140 may forward the HIP challenge 185 to the computing device 155 of a human 160 working at a Turing Farm 150. The Turing Farm human 160 may solve the HIP challenge 185 and return a HIP response 550, e.g., a designation of the characters in the HIP image, in their correct order, to a server 190 of the unwanted entity 140. The unwanted entity server 190, in turn, submits the HIP response 550 to the server 125 hosting, or otherwise supporting, the computing service 105 via the internet 115.

The submitted HIP response 550 will be incorrect because while it may contain the correct solution for the HIP challenge 185, as the Turing Farm computing device 155 does not execute the HIP software 515, including the random group of HIP key codelets 530, the HIP response 550 from the Turing Farm 150 will fail to contain an Active HIP key. Decision software 520 of the embodiment Active HIP 500 determines it has received a correct response for the HIP challenge 185 but that the HIP response 550 failed to be accompanied by, or otherwise associated with, a correct Active HIP key 510 and the unwanted entity 140 fails the Active HIP 500.

In yet another alternative scenario of this embodiment a bot running on an unwanted entity server 190 may forward the HIP web page 155, including the HIP challenge 185, or reference thereto, to a Turing Farm computing device 155. A Turing Farm human 160 reviews the HIP web page 515 looking for the HIP challenge 185. If located, the Turing Farm human 160 may solve the HIP challenge 185 and return a HIP response 550 to a server 190 of the unwanted entity 140. The unwanted entity server 190, in turn, submits the HIP response 550 to the server 125 hosting, or otherwise supporting, the computing service 105.

The submitted HIP response 550 will be incorrect because while it may contain the correct solution for the HIP challenge 185, as the Turing Farm 150 does not execute the HIP web page 515, including the random group of HIP key codelets 530, the HIP response 550 from the Turing Farm 150 will fail to contain an Active HIP key. Decision software 520 of the embodiment Active HIP 500 determines it has received a correct response for the HIP challenge 185 but that the HIP response 550 failed to be accompanied by, or otherwise associated with, the correct Active HIP key 510 and the unwanted entity 140 fails the Active HIP 500.

If the HIP response 550 from an unwanted entity 140 is a correct solution for the HIP challenge 185 but is not accompanied by any, or the correct, random Active HIP key 510 the embodiment Active HIP 500 determines with a degree of certainty that an unwanted entity 140 is attempting to gain access to the computing service 105. In an aspect of this embodiment in this scenario the Active HIP 500 denies the unwanted entity 140 access to the computing service 105. In an alternative aspect of this embodiment in this scenario the Active HIP 500 allows the unwanted entity 140 access to the computing service 105 and thereby attempts to gather information about the unwanted entity 140, e.g., time zone, location, date of execution, time of day of execution, IP address, machine id, etc. In this alternative aspect of this embodiment any such gathered information can be used to, e.g., deny the unwanted entity 140 future access to the computing service 105, etc.

As noted, in a scenario an unwanted entity bot may forward, or otherwise make accessible, the HIP web page 515 to its respective Turing Farm 150 for resolution. In an aspect of this embodiment in this scenario the Active HIP 500 can identify inconsistency(ies) between the identity of the unwanted entity server 190 that originally accessed the Active HIP 500 and the identity of the Turing Farm computing device 155 that ultimately provides a HIP solution. In an aspect of this embodiment any inconsistencies noted are used to determine that an unwanted entity 140 is attempting access to the computing service 105. In an aspect of this embodiment in this scenario the Active HIP 500 may take appropriate action, e.g., deny the unwanted entity 140 any future access to the computing service 105, etc.

In an aspect of this embodiment, if an unwanted entity server 190 or a Turing Farm computing device 155 provides solutions to more than a predetermined number of HIP challenges 185 for access to the computing service 105 the Active HIP 500 identifies the respective server 190 or Turing Farm computing device 155 as a component of an unwanted entity 140. In an aspect of this embodiment in this scenario the Active HIP 500 may take appropriate action to, e.g., deny the unwanted entity 140 any future access to the computing service 105, etc.

In an embodiment one or more software executables for collecting information 535, i.e., characteristics, such as, but not limited to, time zone, location, date of execution, time of day of execution, IP address, machine id, etc., about a user's computing device, also referred to herein as HIP characteristic codelets, are combined, or otherwise stitched or conflated, together by the Active HIP 500 with the HIP key codelets 530 and/or HIP challenge 185. In an aspect of this embodiment the Active HIP 500 randomly selects the HIP characteristic codelet(s) 535 to be conflated with the HIP key codelets 530 and/or HIP challenge 185 from a pool of HIP characteristic codelets 570. In an embodiment the combined HIP key codelets 530 and HIP characteristic codelet(s) 535 form Active HIP software 545.

In an aspect of this embodiment the HIP characteristic codelet(s) 535 execute when the Active HIP software 545 executes the HIP key codelets 530 to collect information 580, e.g., time zone, location, date of execution, time of day of execution, IP address, machine id, etc., about the computing device the Active HIP software 545 is running on. In this aspect of this embodiment the HIP characteristic codelet(s) 535 execute when the Active HIP software 545 executes the HIP key codelets 530 to provide the collected information 580 to the Active HIP 500.

In another aspect of this embodiment the HIP characteristic codelet(s) 535, or a portion thereof, execute only when the Active HIP software 545 executes and there is information indicative of an unwanted entity, server 190 or Turing Farm 150, attempting unwarranted access to the computing service 105.

In an embodiment the Active HIP software 545 is obfuscated from breakage by interleaving the HIP characteristic codelet(s) 535 and the HIP key codelets 530 provided to, or otherwise made accessible to, a user's computing device.

In an alternative embodiment, within one or more of the group of random HIP key codelets 530 there is executable characteristic software for collecting and providing to the Active HIP 500 characteristics of the executing computing device, including but not limited to, the computing device's time zone, location, date of execution, time of day of execution, IP address, machine id, etc. Information collected by the characteristic software can be used to, e.g., identify an unwanted entity 140, deny an unwanted entity 140 access to the computing service 105, etc.

In an embodiment the determinator 520 of the Active HIP 500 uses information 580 collected by the HIP characteristic codelet(s) 535, or characteristic software, to potentially identify an unwanted entity 140 attempting access to the computing service 105.

In an embodiment, if the Active HIP 500 determines, e.g., from the collected information 580, that an unwanted entity 140 is attempting access to the computing service 105 the Active HIP 500 denies the unwanted entity 140 access to the computing service 105. In another embodiment, if the Active HIP 500 determines a potential unwanted entity 140 is attempting access to the computing service 105, the HIP web page 515 posts an interactive window 300 indicating fraud is suspected, an embodiment of which is shown in FIG. 3 and discussed therewith.

In an embodiment Active HIP code, e.g., JavaScript® software, Flash® software, Silverlight® software, etc., implementing an Active HIP dynamically generates a random Active HIP key that must be associated with the solution to a HIP challenge, e.g., an obfuscated HIP image, in order for a user to gain legitimate access to a computing service protected by the Active HIP. In an aspect of this embodiment Active HIP a first randomly obtained HIP challenge is dynamically replaced with a second randomly obtained HIP challenge. In an alternative aspect of this embodiment Active HIP a first randomly obtained HIP challenge is dynamically modified to a second random HIP challenge.

In an aspect of this embodiment Active HIP the Active HIP key is forty (40) bits of a dynamically generated random combination of ones and zeros. In other aspects of this embodiment the generated Active HIP key can be other lengths.

Figure 6:
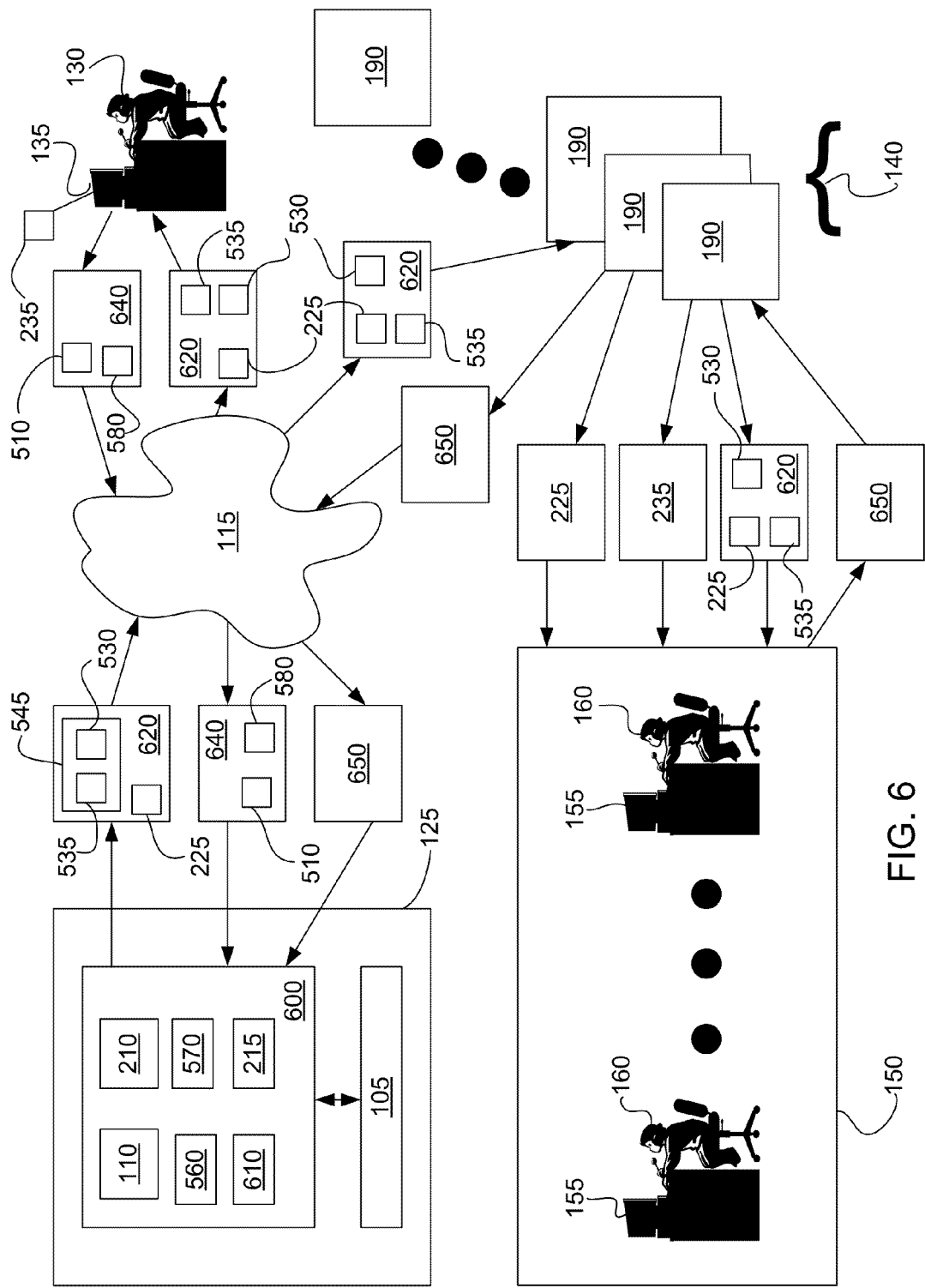
FIG. 6 depicts an embodiment Active HIP system involving dynamically replaceable HIP challenges and dynamically generated random Active HIP keys.

Referring to FIG. 6, in an embodiment there are eighty (80) different HIP key codelets in a pool of HIP key codelets 560, each responsible for generating one (1) bit of an Active HIP key 510. In an aspect of this embodiment forty (40) different, unique, HIP key codelets of the pool of HIP key codelets 560 each generates a zero bit, i.e., a bit with a zero (0) value, for an Active HIP key 510. In an aspect of this embodiment an additional forty (40) different, unique, HIP key codelets of the pool of HIP key codelets 560 each generates a one bit, i.e., a bit with a one (1) value, for an Active HIP key 510.

In alternative embodiments there can be other numbers and/or combinations of unique HIP key codelets responsible for generating one or more bits of an Active HIP key 510.

In an embodiment the Active HIP 600 for protecting a computing service 105 dynamically stitches together, or otherwise combines or conflates, forty (40) random HIP key codelets 530 from the pool of eighty (80) different HIP key codelets 560 and associates the resultant HIP key codelet combination with the HIP challenge to be solved.

In other embodiments the Active HIP 600 for protecting a computing service 105 dynamically stitches together, or otherwise combines or conflates, other numbers and/or combinations of random HIP key codelets 530 and associates the resultant HIP key codelet combination with the HIP challenge to be solved.

When executed the group of HIP key codelets 530 generates a random Active HIP key 510.

In aspects of these embodiments the code implementing the Active HIP 600 is obfuscated from breakage by interleaving the HIP key codelets 530 for generating a particular random Active HIP key 510.

In alternative embodiments Active HIP keys are other entities that can be created by the random association of randomly generated software codelets, e.g., images randomly constructed from codelets that generate random pixel groups, sentences constructed from randomly associated words, etc.

When a legitimate human user 130 desires to access the computing service 105 the Active HIP 600 downloads, or otherwise makes accessible, HIP software, e.g., a HIP web page, 620 to the user's computing device 135. In an embodiment the HIP web page 620 includes a first HIP challenge 225, or reference thereto, randomly selected by a HIP challenge generator 215 from a first pool of HIP challenges 110. In an alternative embodiment the HIP web page 620, when executing the HIP challenge generator 215, contemporaneously generates a first HIP challenge 225.

In an embodiment the first HIP challenge 225 is a problem, or puzzle. In alternative aspects of this embodiment other first HIP challenges can be used, e.g., but not limited to, a first HIP audio stream, where the user is expected to respond with a typed version of what they heard in the first HIP audio stream, a first HIP sentence, where a user is expected to respond by submitting a missing word, or words, for the first HIP sentence, a first HIP image, or collection of images, containing one or more animals, or other items, to be identified, etc.

In this embodiment Active HIP 600 the HIP web page 620 downloaded, or otherwise accessible, to the computing device 135 also contains a random group of HIP key codelets 530 that, when executed, dynamically generate a random Active HIP key 510.

In an embodiment Active HIP 600 the HIP web page 620 executes on the computing device 135 of the legitimate human 130 and dynamically replaces the first HIP challenge 225, or reference thereto, with a second HIP challenge 235, or reference thereto. In an aspect of this embodiment the HIP challenge generator 215 identifies, or otherwise obtains, the second HIP challenge 235 by randomly selecting the second HIP challenge 235 from the first pool of HIP challenges 110. In an alternative aspect of this embodiment the second HIP challenge 235 is randomly selected from a second pool of HIP challenges 210. In a second alternative aspect of this embodiment the HIP challenge generator 215 contemporaneously generates, i.e., generates on the fly, the second HIP challenge 235 during execution of the HIP web page 620. In a third alternative aspect of this embodiment the HIP web page 620 executing, or otherwise enabled, on the computing device 135 of the legitimate human user 130 dynamically modifies the first HIP challenge 225, or reference thereto, to a second HIP challenge 235, or reference thereto.

In an embodiment the second HIP challenge 235 is a problem, or puzzle that the legitimate human user 130 must solve in order to gain access to the computing service 105. In alternative aspects of this embodiment other second HIP challenges can be used, e.g., but not limited to, a second HIP audio stream, where the user is expected to respond with a typed version of what they heard in the second HIP audio stream, a second HIP sentence, where a user is expected to respond by submitting a missing word, or words, for the second HIP sentence, a second HIP image, or collection of images, containing one or more animals, or other items, to be identified, etc.

The HIP web page 620 executes on the computing device 135 of the legitimate human 130 and displays, or otherwise provides, the second HIP challenge 235 to the human user 130. The legitimate human user 130 thereafter submits a HIP response 640, e.g., a designation of the characters in the second HIP image 235, in their correct order, via the internet 115 to the server 125 hosting, or otherwise supporting, the computing service 105.

In an embodiment the HIP web page 620 executing on the legitimate user's computing device 135 runs the group of randomly selected HIP key codelets 530 and generates a random Active HIP key 510. In an embodiment the Active HIP key 510 accompanies, or is otherwise associated with, the HIP response 640 from the legitimate user 130. Decision software, also referred to as a determinator, 610 of the Active HIP 600 determines whether a received HIP response is correct and is accompanied by, or otherwise associated with, a correct Active HIP key 510. In an embodiment, if the HIP response 640 correctly identifies the second HIP challenge 235 and is accompanied by, or otherwise associated with, the correct Active HIP key 510 the legitimate human user 130 is granted access to the computing service 105.

In an embodiment the first HIP challenge 225 is tagged with a globally unique identifier, GUID, such as, but not limited to, a number associated with the filename of the first HIP challenge 225. In an embodiment the GUID is sixty-four (64) bits. In other embodiments the GUID can be other bit lengths. In an embodiment the GUID associated with the first HIP challenge 225 is used by the HIP web page 620 executing on the computing device 135 of a legitimate human user 130 to replace the first HIP challenge 225 with a second HIP challenge 235 for the user 130 to solve. In an alternative embodiment the GUID associated with the first HIP challenge 225 is used by the HIP web page 620 to modify the first HIP challenge 225 to a second random HIP challenge 235 for the user 130 to solve.

In an embodiment the code implementing the Active HIP 600 can be obfuscated from breakage by interleaving code segments of the HIP web page 620.

As noted, unwanted entities' bots do not execute the HIP web page 620 but merely search the HIP web page 620 for the HIP challenge 225. In an alternative scenario of this embodiment, once the first HIP challenge 225 is located, or otherwise identified, by a bot the bot running on an unwanted entities' server 190 may automatically solve the HIP challenge 225 and submit a HIP response 650 to the server 125 hosting, or otherwise supporting, the computing service 105. As the unwanted entities' bot does not execute the HIP web page 620 the HIP response 650 from the unwanted entity 140 will fail to be accompanied by, or otherwise associated with, an Active HIP key 510.

In this embodiment and scenario decision software 610 of the Active HIP 600 determines it has received a correct response for the first HIP challenge 225 but that the HIP response 650 fails to solve the second HIP challenge 235 or be accompanied by, or otherwise associated with, the correct Active HIP key 510. The unwanted entity 140 thereby fails the Active HIP 600.

In a scenario where the bots of an unwanted entity 140 may, without executing the HIP web page 620, discover, or otherwise identify, the second HIP challenge 235 and present the correct solution for the second HIP challenge 235 to the server 125, the decision software 610 of the Active HIP 600 will still determine with a degree of certainty that the HIP response 650 is from an unwanted entity 140. This is because the HIP response 650 from the unwanted entity 140 will fail to be accompanied by, or otherwise associated with, the correct Active HIP key 510.

In an alternative scenario of this embodiment Active HIP 600, a bot running on a server 190 of an unwanted entity 140 may forward the HIP challenge mined from the HIP web page 620, in this case the first HIP challenge 225, to the computing device 155 of a human 160 working at a Turing Farm 150. The Turing Farm human 160 may solve the first HIP challenge 225 and return a HIP response 650 to a server 190 of the unwanted entity 140. The unwanted entity server 190, in turn, submits the HIP response 650 to the server 125 hosting, or otherwise supporting, the computing service 105 via the internet 115.

In this alternative scenario decision software 610 of the Active HIP 600 determines it has received a correct response for the first HIP challenge 225 but that the HIP response 650 fails to solve the second HIP challenge 235 or be accompanied by, or otherwise associated with, the correct Active HIP key 510. In this alternative scenario the unwanted entity 140 fails the Active HIP 600.

In a second alternative scenario of this embodiment Active HIP 600, a bot running on a server 190 of an unwanted entity 140 may successfully mine, or otherwise discover, the second HIP challenge 235 in the HIP software 620 and thereafter forward the second HIP challenge 235 to the computing device 155 of a human 160 working at a Turing Farm 150. The Turing Farm human 160 may solve the second HIP challenge 235 and return a HIP response 650 to a server 190 of the unwanted entity 140. The unwanted entity server 190, in turn, submits the HIP response 650 to the server 125 hosting, or otherwise supporting, the computing service 105.

In this second alternative scenario decision software 610 of the Active HIP 600 determines it has received a correct response for the second HIP challenge 235 but that the HIP response 650 fails to be accompanied by, or otherwise associated with, the correct Active HIP key 510. In this second alternative scenario the unwanted entity 140 fails the Active HIP 600.

In a third alternative scenario of this embodiment Active HIP 600, a bot executing on a server 190 may forward, or otherwise make available, the HIP web page 620 to a computing device 155 of a Turing Farm 150.

In a first aspect of this third alternative scenario a Turing Farm human 160 reviews the HIP web page 620 and identifies the first HIP challenge 225. The Turing Farm human 160 may solve the first HIP challenge 225 and return a HIP response 650 to a server 190 of the unwanted entity 140. The unwanted entity server 190, in turn, submits the HIP response 650 to the server 125 hosting, or otherwise supporting, the computing service 105.

In this first aspect of this third alternative scenario decision software 610 of the Active HIP 600 determines it has received a correct response for the first HIP challenge 225 but that the HIP response 650 fails to solve the second HIP challenge 235 or be accompanied by, or otherwise associated with, the correct Active HIP key 510. In this first aspect of this third alternative scenario the unwanted entity 140 fails the Active HIP 600.

In a second aspect of this third alternative scenario a Turing Farm human 160 reviews the HIP web page 620 and may be able to mine, or otherwise identify, the second HIP challenge 235. In a scenario the Turing Farm human 160 can identify the second HIP challenge 235 by allowing at least the portion of the HIP web page 620 responsible for dynamically replacing the first HIP challenge 225 with the second HIP challenge 235, or alternatively modifying the first HIP challenge 225 to a second HIP challenge 235, to execute on their respective Turing Farm computing device 155. The Turing Farm human 160 may solve the second HIP challenge 235 and return a HIP response 650 to a server 190 of the unwanted entity 140. The unwanted entity server 190, in turn, submits the HIP response 650 to the server 125 hosting, or otherwise supporting, the computing service 105.

In this second aspect of this third alternative scenario decision software 610 of the Active HIP 600 determines it has received a correct response for the second HIP challenge 235 but that the HIP response 650 fails to be accompanied by, or otherwise associated with, the correct Active HIP key 510. In this second aspect of this third alternative scenario the unwanted entity 140 fails the Active HIP 600.

If the HIP response 650 is a correct solution for the first HIP challenge 225 and/or it is not accompanied by any, or the correct, random Active HIP key 510, the embodiment Active HIP 600 determines with a degree of certainty that an unwanted entity 140 is attempting to gain access to the computing service 105. If the HIP response 650 is a correct solution for the second HIP challenge 235 but it is not accompanied by any, or the correct, random Active HIP key 510, the embodiment Active HIP 600 determines with a degree of certainty that an unwanted entity 140 is attempting to gain access to the computing service 105.

In an embodiment the Active HIP 600 denies a user identified as an unwanted entity 140 access to the computing service 105. In an alternative embodiment the Active HIP 600 grants a user identified as an unwanted entity 140 access to the computing service 105 and thereby attempts to gather information about the unwanted entity 140, e.g., time zone, location, date of execution, time of day of execution, IP address, machine id, etc. In this alternative embodiment any such gathered information can be used to, e.g., deny the unwanted entity 140 any future access to the computing service 105, etc.

As noted, in a scenario of this embodiment an unwanted entity may forward, or otherwise make accessible, the HIP web page 620 to its respective Turing Farm 150 for resolution. In an aspect of this embodiment in this scenario the Active HIP 600 can identify inconsistency(ies) between the identity of the unwanted entity server 190 that originally accessed the Active HIP 600 and the identity of the Turing Farm computing device 155 that ultimately provides a solution for the first HIP challenge 225 or the second HIP challenge 235. In an aspect of this embodiment any inconsistencies noted are used to determine that an unwanted entity 140 is attempting access to the computing service 105. In an aspect of this In an aspect of this embodiment, if an unwanted entity server 190 or a Turing Farm computing device 155 provides solutions for more than a predetermined number of first HIP challenges 225 and/or second HIP challenges 235 for access to the computing service 105, the Active HIP 600 identifies the respective server 190 or Turing Farm computing device 155 as a component of an unwanted entity 140. In an aspect of this embodiment in this scenario the Active HIP 600 may take appropriate action, e.g., deny the unwanted entity 140 any future access to the computing service 105, etc.

In an embodiment one or more software executables for collecting information 535, i.e., characteristics, such as, but not limited to, time zone, location, date of execution, time of day of execution, IP address, machine id, etc., about a user's computing device, also referred to herein as HIP characteristic codelet(s), are combined, or otherwise stitched or conflated, together by the Active HIP 600 with the HIP key codelets 530 and/or first HIP challenge 225. In an aspect of this embodiment the Active HIP 600 randomly selects the HIP characteristic codelet(s) 535 to be stitched with the HIP key codelets 530 and/or first HIP challenge 225 from a pool of HIP characteristic codelets 570. In an embodiment the combined HIP key codelets 530 and HIP characteristic codelet(s) 535 form Active HIP software 545 included with the HIP web page 620.

In an aspect of this embodiment the HIP characteristic codelet(s) 535 execute when the Active HIP software 545 executes the HIP key codelets 530 to collect information 580, e.g., time zone, location, date of execution, time of day of execution, IP address, machine id, etc., about the computing device the Active HIP software 545 is running on. In this aspect of this embodiment the HIP characteristic codelet(s) 535 execute when the Active HIP software 545 executes the HIP key codelets 530 to provide the collected information 580 to the Active HIP 600.

In another aspect of this embodiment the HIP characteristic codelet(s) 535, or a portion thereof, execute only when the Active HIP software 545 executes and there is information indicative of an unwanted entity 140, server 190 or Turing Farm 150, attempting unwarranted access to the computing service 105.

In an alternative embodiment, within one or more of the group of random HIP key codelets 530 there is executable characteristic software for collecting and providing to the Active HIP 600 characteristics of the executing computing device, including but not limited to, the computing device's time zone, location, date of execution, time of day of execution, IP In an embodiment the determinator 610 of the Active HIP 600 uses information 580 collected by the HIP characteristic codelet(s) 535, or characteristic software, to potentially identify an unwanted entity 140 attempting access to the computing service 105.

In an embodiment, if the Active HIP 600 determines, e.g., from collected information 580, that an unwanted entity 140 is attempting access to the computing service 105 the Active HIP 600 denies the unwanted entity 140 access to the computing service 105. In another embodiment, if the Active HIP 600 determines a potential unwanted entity 140 is attempting access to the computing service 105, the HIP web page 620 posts an interactive window 300 indicating fraud is suspected, an embodiment of which is shown in FIG. 3 and discussed therewith.

FIGS. 7A, 7B, 7C and 7D illustrate an embodiment logic flow for implementing an Active HIP involving generating random Active keys and dynamically replacing, or alternatively modifying, HIP challenges to distinguish between legitimate and unwarranted user access to a computing system. While the following discussion is made with respect to systems portrayed herein, the operations described may be implemented in other systems. Further, the operations described herein are not limited to the order shown. Additionally, in other embodiments more or fewer operations may be performed.

Figure 7A:
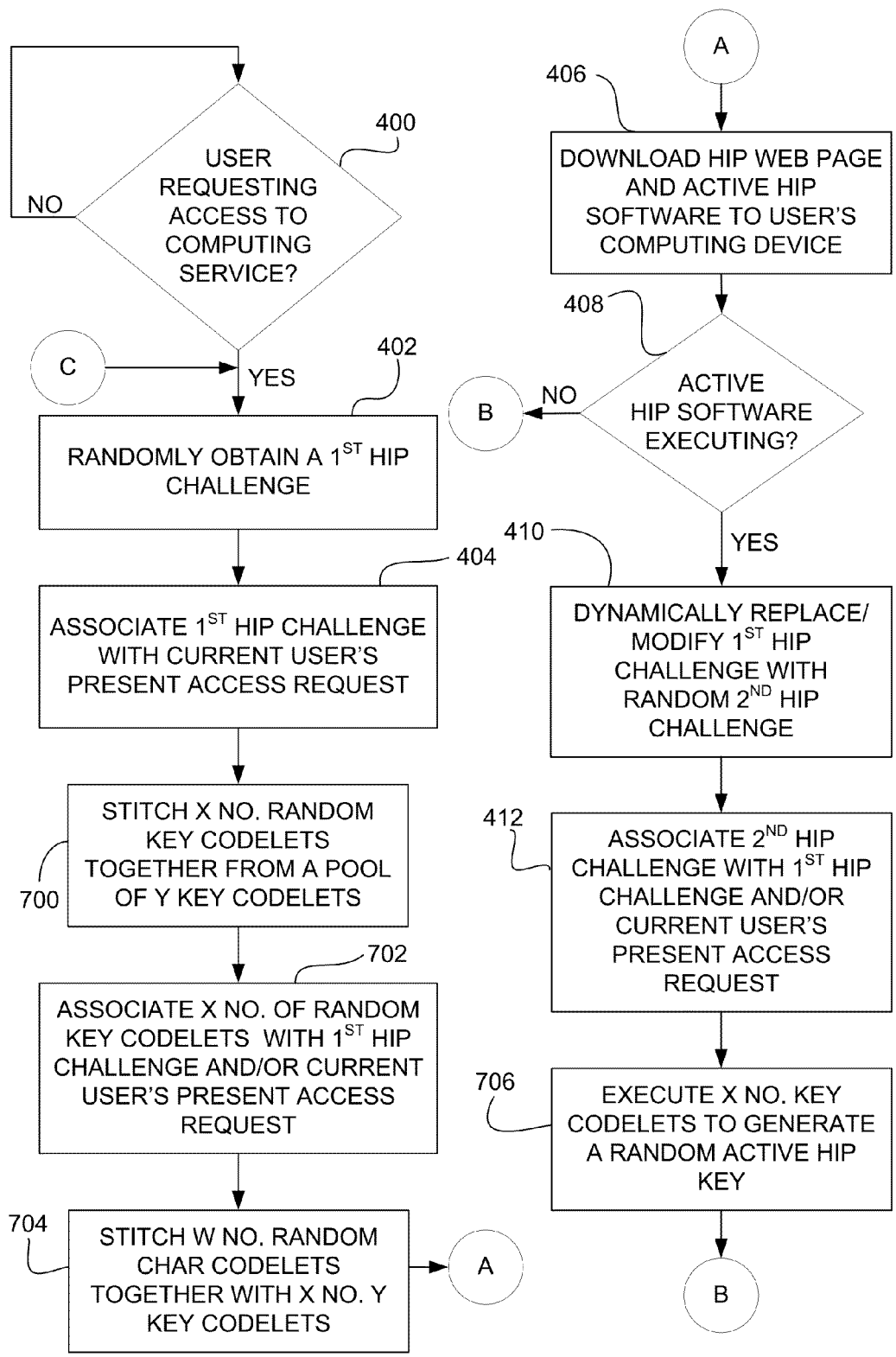
FIGS. 7A-7D illustrate an embodiment logic flow for an Active HIP system involving dynamically replaceable HIP challenges and dynamically generated random Active HIP keys.

Referring to FIG. 7A, a determination is made as to whether a user, human or otherwise, is requesting access to a computing service protected by an embodiment Active HIP 400. If no, the system continues to loop waiting for a user access request. If, however, a user is requesting access to the computing service, in an embodiment a HIP challenge generator identifies, or otherwise obtains, a first HIP challenge 402. In an embodiment the HIP challenge generator is software that randomly selects a first HIP challenge from a pool, or other collection, of available HIP challenges 402.

In an aspect of this embodiment the first HIP challenge randomly selected is obfuscated 402. In an alternative aspect of this embodiment the pool, or other collection, of available HIP challenges from which the first HIP challenge is randomly selected are challenges, or puzzles which have already been obfuscated and are associated with a correct identification of their respective challenge. In a second alternative aspect of this embodiment the pool of HIP challenges from which the first HIP challenge is randomly selected are not obfuscated and require no obfuscation.

In an alternative embodiment the HIP challenge generator identifies, or otherwise obtains, a first HIP challenge by generating, or otherwise creating or assembling, a first HIP challenge on the fly, i.e., contemporaneously, 402. In an aspect of this alternative embodiment the first HIP challenge is obfuscated at the time it is randomly generated 402. In an alternative aspect of this alternative embodiment the first HIP challenge is obfuscated after it is randomly generated 402. In a second alternative aspect of this alternative embodiment the first HIP challenge is not obfuscated and requires no obfuscation.

In an embodiment the first HIP challenge is associated with the current user's present access request 404, e.g., is associated with the current user's computing device and/or access session, etc.

In an embodiment x number of HIP key codelets are randomly selected from a pool of y number of HIP key codelets and are stitched, or otherwise combined or conflated, with the HIP web page to be executed on a user's computing device 700. In an embodiment when the HIP key codelets thereafter execute they generate a unique random Active HIP key.

In an embodiment x is equal to forty (40) codelets randomly selected from a pool, or collection, of y equal to eighty (80) codelets. In other embodiments other numbers of codelets are randomly selected from a pool of HIP key codelets and are stitched together to be executed on a user's computing device, e.g., but not limited to, fifty (50) codelets, sixty (60) codelets, thirty (30) codelets, etc. In other embodiments the pool, or collection, of HIP key codelets has various alternative numbers of HIP key codelets, e.g., but not limited to, one hundred (100) codelets, two hundred (200) codelets, sixty (60) codelets, etc.

In an embodiment half of the pool of HIP key codelets, i.e., fifty percent, execute to each generate a zero (o) bit, i.e., a bit with a value of zero (0), and the other half of the pool of codelets, i.e., the other fifty percent, execute to each generate a one (1) bit, i.e., a bit with a value of one (1). In this embodiment the Active HIP key generated by the execution of the HIP key codelets is a forty (40) bit string, or number, consisting of a random combination of ones and/or zeros.

In other embodiments different combinations of the pool of HIP key codelets are used to generate the zero bits and the one bits, e.g., but not limited to, twenty five percent of the pool of HIP key codelets each generate a zero (0) bit and seventy five percent of the pool of HIP key codelets each generate a one (1) bit; thirty percent of the pool of codelets each generate a zero (0) bit and seventy percent of the pool of codelets each generate a one (1) bit, etc.

In other embodiments each HIP key codelet of the pool of HIP key codelets generates other key types, e.g., but not limited to, image strings of two or more random images strung together in random order; a random image consisting of pieces of other random images connected together in random order; an audio string of two or more random audio files each consisting of one or more random notes strung together in random order; etc.

In an embodiment the x number of random HIP key codelets and/or the resultant Active HIP key they generate is associated with the first HIP challenge 702. In another embodiment the x number of random HIP key codelets and/or the resultant Active HIP key they generate is associated with the current user's present access request 702. In still another embodiment the x number of random HIP key codelets and/or the resultant Active HIP key they generate is associated with both the first HIP challenge and the current user's present access request 702.

In an embodiment w number of HIP characteristic codelets are randomly selected from a pool of z number of HIP characteristic codelets and are stitched, or otherwise combined or conflated, with the x number of random HIP key codelets 704. In alternative embodiments the w number of HIP characteristic codelets are also, or alternatively, conflated with the first HIP challenge 704. In an embodiment the combined HIP characteristic codelets and HIP key codelets form Active HIP software included with the HIP web page.

In an alternative embodiment HIP characteristic software is included within the HIP key codelets and/or the HIP web page 704.

The HIP web page is downloaded to, or otherwise made accessible to, a user's computing device 406.

In an embodiment the HIP characteristic codelets, or characteristic software, when executed, collect information, e.g., time zone, location, date of execution, time of day of execution, IP address, machine id, etc., about the computing device the Active HIP software is running on.

In an embodiment, upon the HIP web page executing, or otherwise being enabled, 408 on the user's computing device, the first HIP challenge is dynamically replaced with a second HIP challenge 410. In an embodiment the HIP challenge generator identifies, or otherwise obtains, the second HIP challenge by randomly selecting the second HIP challenge from a pool, or other collection, of available HIP challenges 410. In an aspect of this embodiment the second HIP challenge randomly selected is obfuscated 410. In an alternative aspect of this embodiment the pool of available HIP challenges from which the second HIP challenge is randomly selected are challenges, or puzzles which have already been obfuscated In an embodiment the pool, or other collection, of available HIP challenges from which a second HIP challenge is randomly selected is the same as the pool of available HIP challenges from which the first HIP challenge is randomly selected. In an alternative embodiment the pool, or other collection, of available HIP challenges from which a second HIP challenge is randomly selected is different from the pool of available HIP challenges from which the first HIP challenge is randomly selected.

In an alternative embodiment the second HIP challenge is randomly generated, or otherwise created or assembled, on the fly, i.e., contemporaneously, 410. In an aspect of this alternative embodiment the second HIP challenge is obfuscated at the time it is randomly generated 410. In an alternative aspect of this alternative embodiment the second HIP challenge is obfuscated after it is randomly generated 410. In a second alternative aspect of this alternative embodiment the second HIP challenge is not obfuscated and requires no obfuscation.

In another alternative embodiment, upon the HIP web page executing, or otherwise being enabled, 408 on the user's computing device the first HIP challenge is dynamically modified to a random second HIP challenge 410.

In an embodiment the second HIP challenge is associated with the first HIP challenge 412. In another embodiment the second HIP challenge is associated with the current user's present access request 412, e.g., is associated with the current user's computing device and/or access session, etc. In still another embodiment the second HIP challenge is associated with both the first HIP challenge and the current user's present access request 412.

Figure 7B:
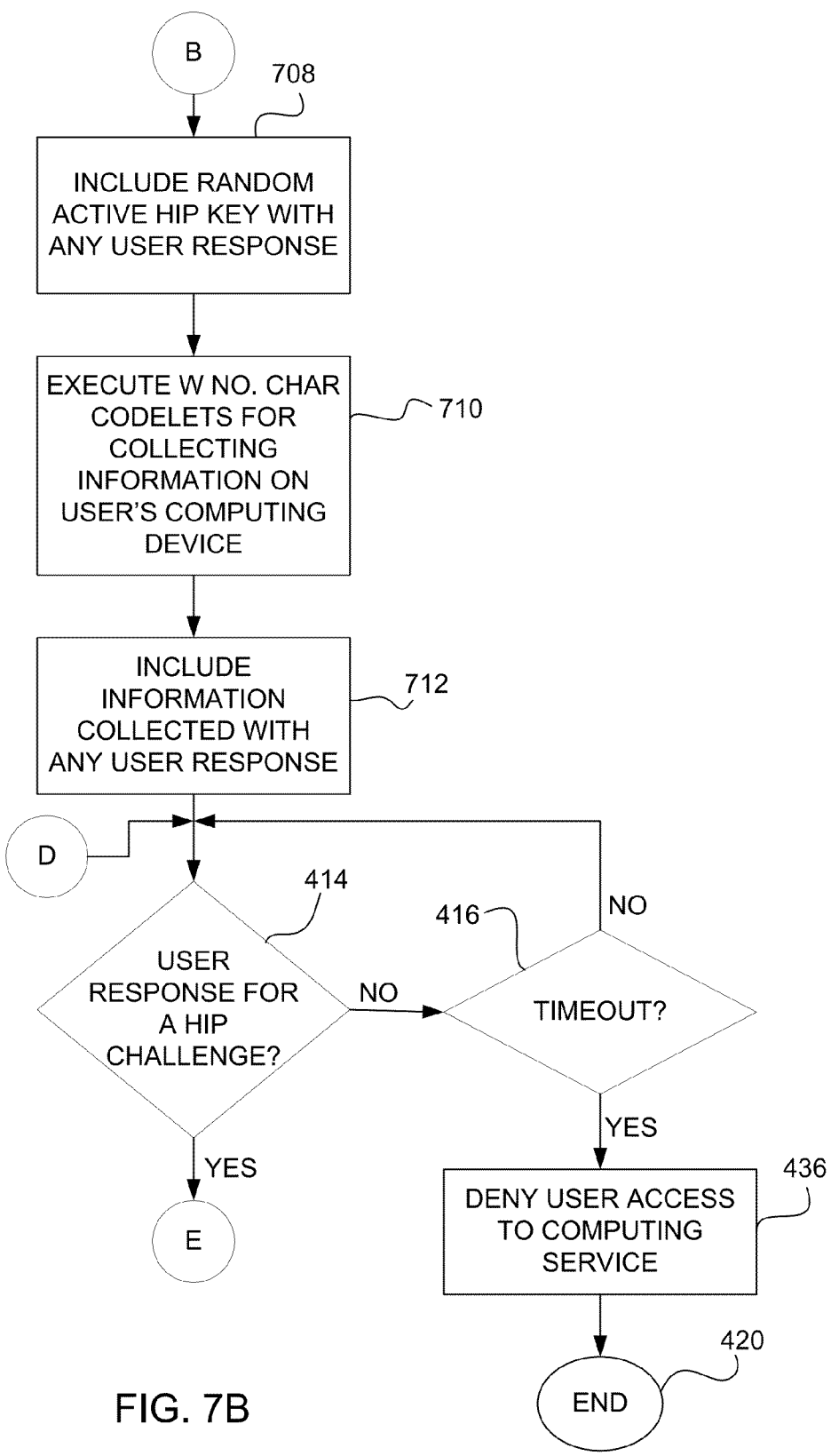

In an embodiment the Active HIP software executing on the current user's computing device executes the x number of HIP key codelets and generates a random Active HIP key 706. Referring to FIG. 7B, in an embodiment the generated Active HIP key is included with, or otherwise associated with, any user response for a HIP challenge 708.

In an embodiment the HIP characteristic codelets, or characteristic software, execute when the Active HIP software executes to collect information, e.g., time zone, location, date of execution, time of day of execution, IP address, machine id, etc., about the computing device the Active HIP software is running on 710. In this embodiment the HIP characteristic codelets execute when the Active HIP software executes to provide the collected information to the Active HIP 712.

In another embodiment the HIP characteristic codelets, or characteristic software, or a portion thereof, execute only when the Active HIP software executes and there is information indicative of an unwanted entity server or Turing Farm attempting unwarranted access to the computing service 710.

At decision block 414 a determination is made as to whether the current user has provided a response for a HIP challenge. If the user is a legitimate human user and the Active HIP software is executing on the user's computing device then the user is expected to provide a response to the second HIP challenge. Alternatively, if the user is an unwanted entity, either automated software code, e.g., a bot, or a human user working at a Turing Farm, that has not allowed the HIP software to execute then the unwanted entity can be expected to provide a response, if any, to the first HIP challenge.

If at decision block 414 it is determined that no response has been provided for a HIP challenge, in an embodiment at decision block 416 a determination is made as to whether a preset time limit has expired. If a preset time limit has expired with no response being sent for a HIP challenge then in an embodiment the user is not granted access to the relevant computing service 436 and Active HIP processing ends 420. Otherwise, if the preset time limit has not expired the system continues to either wait for a response to a HIP challenge 414 or for the preset time limit to expire 416.

Figure 7C:
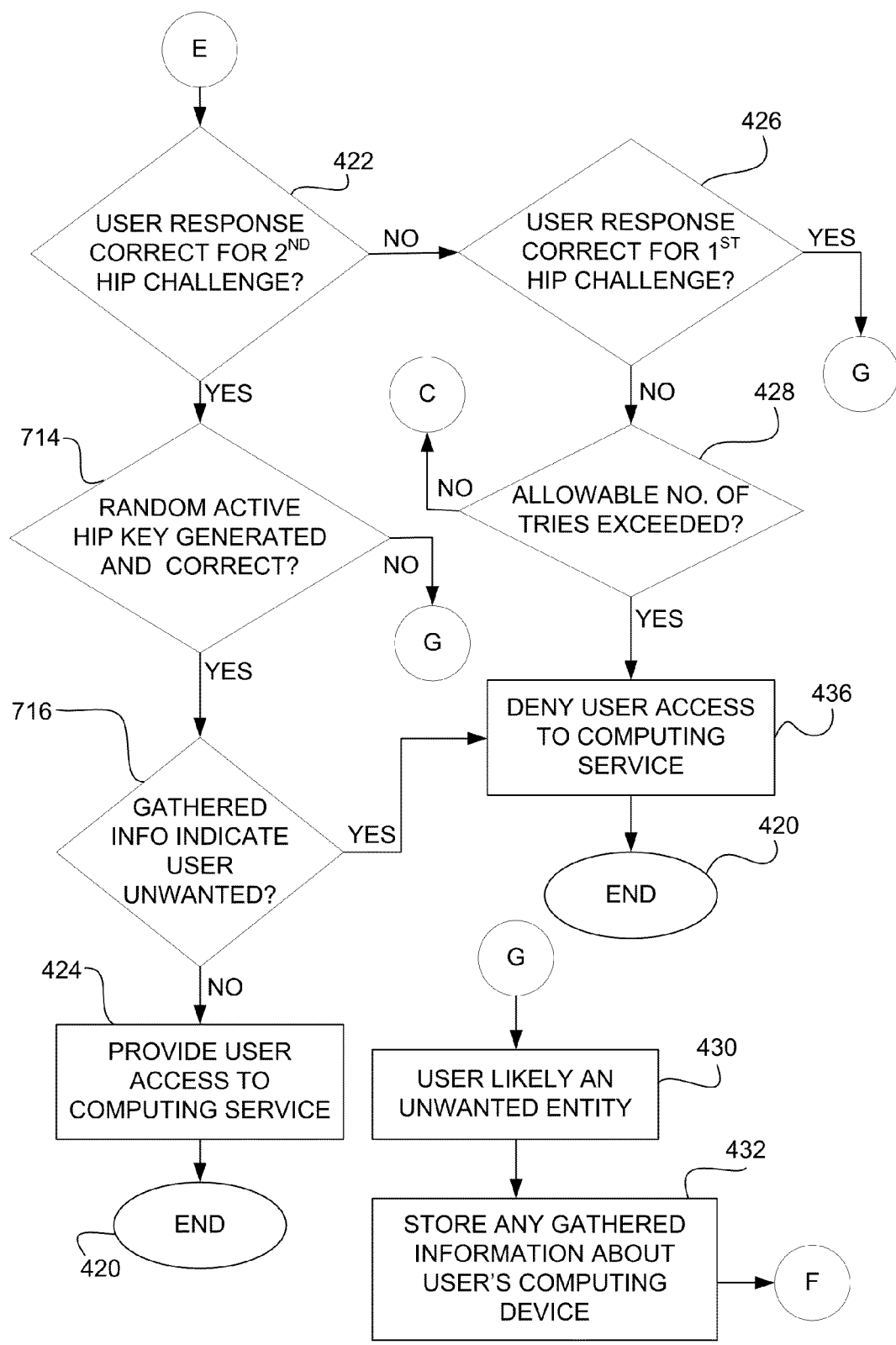

Referring to FIG. 7C, if the current user provides a response to a HIP challenge before any time limit expires then at decision block 422 a determination is made as to whether the user response is correct for the second HIP challenge. If yes, then at decision block 714 a determination is made as to whether there is an accompanying, or otherwise associated, Active HIP key and if so, if it is correct.

If yes, in an embodiment at decision block 716 a determination is made as to whether information gathered by the HIP characteristic codelets, or characteristic software, about the current user's computing device indicates the user is an unwanted entity. If yes, in an embodiment the user is denied access to the computing service 436 and Active HIP processing ends 420.

In an embodiment, if the user response to the second HIP challenge is accompanied by, or otherwise associated with, the expected Active HIP key and the gathered information does not indicate the user is an unwanted entity, the current user is granted access to the computing service 424. Active HIP processing then ends 420.

If at decision block 422 it is determined that the current user did not provide a correct response for the second HIP challenge then at decision block 426 a determination is made as to whether the current user provided a correct response to the first HIP challenge. If no, in an embodiment a determination is made that the user is likely a legitimate human user who was unable to solve the second HIP challenge. In this situation, in an embodiment at decision block 428 a determination is made as to whether a preset allowable number of HIP attempts have already been made for the current user session. If the user, legitimate or unwanted, has failed a preset number of attempts to successfully solve second HIP challenges then in an embodiment the user is denied access to the relevant computing service 436 and Active HIP processing ends 420.

If however, the current user has not already used all their tries at successfully responding to the Active HIP web page then, referring to FIG. 7A, the Active HIP again identifies, or otherwise obtains, a first HIP challenge 402.

Referring back to decision block 426 of FIG. 7C, if it is determined that the current user has successfully responded to the first HIP challenge in an embodiment a determination is made that the user is an unwanted entity who has not properly executed the HIP web page 430. Likewise, referring back to decision block 714, if it is determined that either no Active HIP key accompanied the user response or the accompanying Active HIP key is incorrect in an embodiment a determination is made that the user is an unwanted entity who has failed to properly execute the HIP web page 430. In an embodiment any information gathered, or otherwise collected, by the HIP characteristic codelet(s), or characteristic software, is stored 432.

Figure 7D:
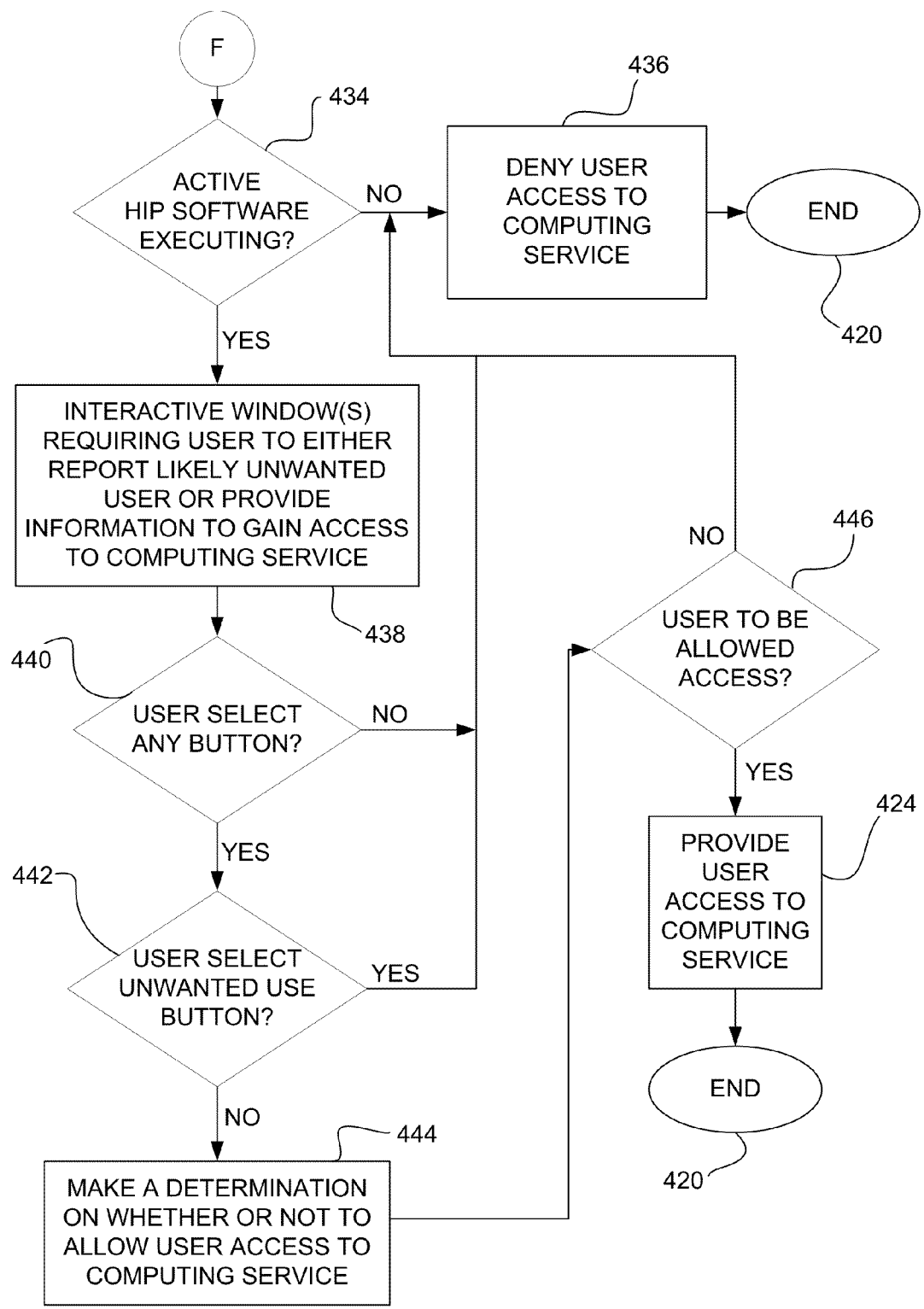

Referring to FIG. 7D, in an embodiment, if the HIP web page is not executing on the current user's computing device 434 an assumption is that the current user is unwanted automated software and the current unwanted entity is denied access to the relevant computing service 436 and Active HIP processing terminates 420.

In an embodiment, if the HIP web page is executing on a computing device 434 and a correct response to the first HIP challenge has been submitted an assumption is that either a human at a Turing Farm identified, or otherwise mined, the first HIP challenge in the HIP web page and correctly solved it or an automated bot has infected an otherwise legitimate human user's computing device and is thereby attempting to gain unwarranted access to the computing service.

In an embodiment, if the HIP web page is executing on a computing device 434 and a correct response to the second HIP challenge has been submitted but there is no accompanying correct Active HIP key, an assumption is that either a human at a Turing Farm was able to identify, or otherwise mine, the second HIP challenge and correctly analyze it or an automated bot has infected an otherwise legitimate human user's computing device and is thereby attempting to gain unwarranted access to the computing service.

In these situations, in an embodiment the Active HIP displays, or otherwise provides, an interactive window(s) on the current user's computing device display, e.g., a monitor, etc., if there is a display 438. In an embodiment the interactive window(s) requires the current user to, via screen buttons, or other input mechanisms, either report a likely unwarranted attempted access to the computing service or provide user information, e.g., identity, location, etc., to be allowed access to the desired computing service 438.

In an embodiment at decision block 440 a determination is made as to whether the current user selected any screen button, or otherwise provided any required window response, within a predefined time limit. If no, an assumption is that the current user is an unwanted entity. In this scenario and embodiment the current user is denied access to the relevant computing service 436 and the Active HIP terminates processing 420.

If at decision block 440 it is determined that the user provided a response via the interactive window then at decision block 442 a determination is made as to whether the user selected the window button, or otherwise identified, that the current access attempt is likely unwarranted. If yes, an assumption is that an unwanted entity is attempting access to the computing service and in an embodiment the current user is denied access to the computing service 436. In this scenario and embodiment Active HIP processing terminates 420.

If, however, it is determined that the current user indicated via the interactive window(s) that the present computing service access is legitimate then in an embodiment the Active HIP makes a determination on whether to allow the current user access to the computing service 444. In an embodiment the Active HIP uses information provided by the user via the interactive window(s) to make a determination on whether to allow the current user access 444. In an embodiment in this scenario the current user may be provided access to the computing service although the user is a suspected unwanted entity in order to, among other reasons, potentially have the opportunity to interact with and learn more about the current user for future use in handling the current user's unwarranted access attempts to the computing service.

At decision block 446 if the determination has been made to allow the current user access then the current user is provided access to the relevant computing service 424 and the Active HIP processing terminates 420. Alternatively, at decision block 446 if the determination has been made to deny the current user access the current user is denied access to the relevant computing service 436 and the Active HIP processing terminates 420.

In other embodiments Active HIP methodology can include use of HIP key codelets and an Active HIP key without requiring a first HIP challenge to be dynamically replaced with, or alternatively modified to, a second HIP challenge. In other embodiments Active HIP methodology can include use of HIP key codelets and an Active HIP key without use of HIP characteristic codelet(s) or HIP characteristic software.

Computing Device System Configuration

Figure 8:
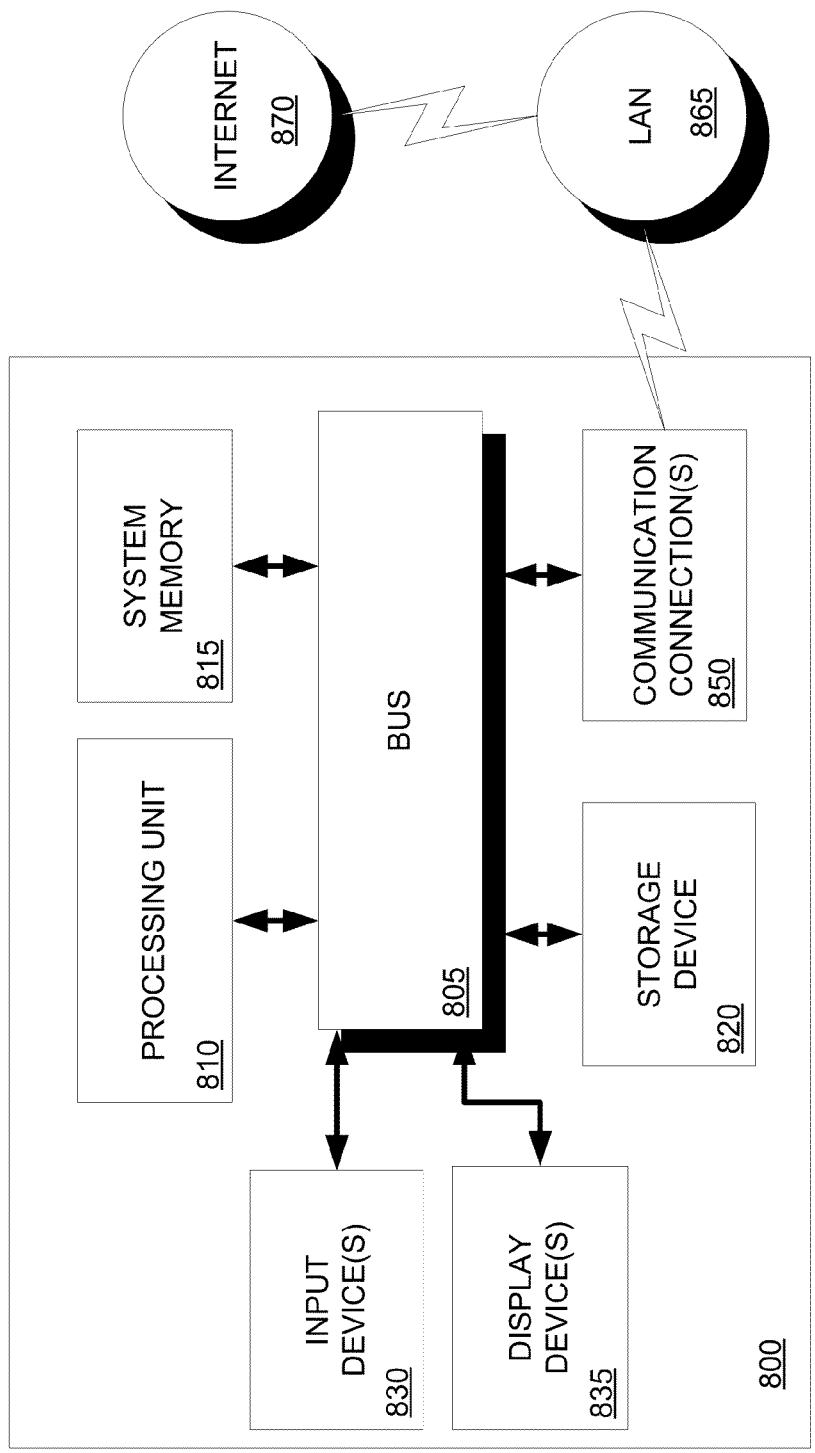
FIG. 8 is a block diagram of an exemplary basic computing device system that can process software, i.e., program code, or instructions.

FIG. 8 is a block diagram that illustrates an exemplary computing device system 800 upon which an embodiment can be implemented. The computing device system 800 includes a bus 805 or other mechanism for communicating information, and a processing unit 810 coupled with the bus 805 for processing information. The computing device system 800 also includes system memory 815, which may be volatile or dynamic, such as random access memory (RAM), non-volatile or static, such as read-only memory (ROM) or flash memory, or some combination of the two. The system memory 815 is coupled to the bus 805 for storing information and instructions to be executed by the processing unit 810, and may also be used for storing temporary variables or other intermediate information during the execution of instructions by the processing unit 810. The system memory 815 often contains an operating system and one or more programs, and may also include program data.

In an embodiment, a storage device 820, such as a magnetic or optical disk, is also coupled to the bus 805 for storing information, including program code comprising instructions and/or data.

The computing device system 800 generally includes one or more display devices 835, such as, but not limited to, a display screen, e.g., a cathode ray tube (CRT) or liquid crystal display (LCD), a printer, and one or more speakers, for providing information to a computing device user. The computing device system 800 also generally includes one or more input devices 830, such as, but not limited to, a keyboard, mouse, trackball, pen, voice input device(s), and touch input devices, which a computing device user can use to communicate information and command selections to the processing unit 810. All of these devices are known in the art and need not be discussed at length here.

The processing unit 810 executes one or more sequences of one or more program instructions contained in the system memory 815. These instructions may be read into the system memory 815 from another computing device-readable medium, including, but not limited to, the storage device 820. In alternative embodiments, hard-wired circuitry may be used in place of or in combination with software program instructions. The computing device system environment is not limited to any specific combination of hardware circuitry and/or software.

The term "computing device-readable medium" as used herein refers to any medium that can participate in providing program instructions to the processing unit 810 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 815 and storage device 820 of the computing device system 800 are further examples of storage media. Examples of transmission media include, but are not limited to, wired media such as coaxial cable(s), copper wire and optical fiber, and wireless media such as optic signals, acoustic signals, RF signals and infrared signals.

The computing device system 800 also includes one or more communication connections 850 coupled to the bus 805. The communication connection(s) 850 provide a two-way data communication coupling from the computing device system 800 to other computing devices on a local area network (LAN) 865 and/or wide area network (WAN), including the World Wide Web, or Internet 870. Examples of the communication connection(s) 850 include, but are not limited to, an integrated services digital network (ISDN) card, modem, LAN card, and any device capable of sending and receiving electrical, electromagnetic, optical, acoustic, RF or infrared signals.

Communications received by the computing device system 800 can include program instructions and program data. The program instructions received by the computing device system 800 may be executed by the processing unit 810 as they are received, and/or stored in the storage device 820 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for implementing an Active HIP for protecting a computing service from unwarranted access, the method comprising:
   randomly selecting a HIP challenge from a pool of two or more HIP challenges;
   randomly selecting a set quantity of Active HIP key codelets from a collection of two or more Active HIP key codelets, wherein the set quantity of Active HIP key codelets, executed, generates a correct Active HIP key;
   selecting a set quantity of Active HIP characteristic codelets from a collection of one or more Active HIP characteristic codelets, wherein the set quantity of Active HIP characteristic codelets, when executed, collects information about a computing device;
   conflating the set quantity of Active HIP key codelets and the set quantity of Active HIP characteristic codelets with the HIP challenge in Active HIP software to be executed by a computing device that requested the computing service;
   providing the Active HIP software to the computing device that requested the computing service;
   receiving a response to the Active HIP software;
   allowing access to the computing service when the response to the Active HIP software comprises a correct solution for the HIP challenge, the correct Active HIP key, the correct Active HIP key being different from the correct solution for the HIP challenge, and information about the computing device that indicates the computing device is not attempting an unwarranted access to the computing service;
   denying access to the computing service when the response to the Active HIP software does not comprise the correct solution for the HIP challenge;
   denying access to the computing service when the response to the Active HIP software does not comprise the correct Active HIP key; and
   denying access to the computing service when the response to the Active HIP software comprises information about the computing device that indicates that the computing device is attempting an unwarranted access to the computing service.

2. The method for implementing an Active HIP for protecting a computing service from unwarranted access of claim 1, wherein a HIP web page comprises the Active HIP software.

3. The method for implementing an Active HIP for protecting a computing service from unwarranted access of claim 1, wherein the HIP challenge is an image and this HIP image is obfuscated prior to being conflated into the Active HIP software.

4. The method for implementing an Active HIP for protecting a computing service from unwarranted access of claim 1, wherein each one of the set quantity of Active HIP key codelets, when executed, generates a bit with a value of zero or a bit with a value of one.

5. The method for implementing an Active HIP for protecting a computing service from unwarranted access of claim 1, wherein half of the collection of two or more Active HIP key codelets, when executed, each generates a bit with a value of zero and the other half of the collection of two or more Active HIP key codelets, when executed, each generates a bit with a value of one.

6. The method for implementing an Active HIP for protecting a computing service from unwarranted access of claim 1, wherein the response to the Active HIP software comprises an Active HIP key and information about the computing device collected by the Active HIP software when the set quantity of Active HIP characteristic codelets are executed by the computing device.

7. The method for implementing an Active HIP for protecting a computing service from unwarranted access of claim 6, wherein information about the computing device collected by the Active HIP software when the set quantity of Active HIP characteristic codelets are executed by the computing device comprises an IP address for the computing device.

8. The method for implementing an Active HIP for protecting a computing service from unwarranted access of claim 1, wherein the set quantity of Active HIP key codelets is a set of forty Active HIP key codelets and the collection of Active HIP key codelets is a collection of eighty Active HIP key codelets.

9. The method for implementing an Active HIP for protecting a computing service from unwarranted access of claim 8, wherein forty Active HIP key codelets of the collection of Active HIP key codelets, when executed, each generates a bit with a value of zero and forty other Active HIP key codelets of the collection of Active HIP key codelets, when executed, each generates a bit with a value of one.

10. The method for implementing an Active HIP for protecting a computing service from unwarranted access of claim 1, wherein the HIP challenge is a first HIP challenge, the method further comprising:
randomly selecting a second HIP challenge from a pool of two or more HIP challenges; and
including software in the Active HIP software that, when executed, modifies the second HIP challenge so that a correct response to the modified second HIP challenge is the correct response to the first HIP challenge.

11. The method for implementing an Active HIP for protecting a computing service from unwarranted access of claim 10, the method further comprising modifying the HIP challenge wherein a correct response to the HIP challenge is a correct response to the modified HIP challenge.

12. A system for implementing an Active HIP for protecting a computing service from unwarranted access, the system comprising:
a processor operatively coupled to a memory and configured to provide:
a pool of HIP challenges from which a HIP challenge can be randomly selected;
a collection of Active HIP key codelets from which collection a set quantity of Active HIP key codelets can be randomly selected that, when executed, generates a correct Active HIP key;
a combination application to conflate the set quantity of Active HIP key codelets and the set quantity of Active HIP characteristic codelets with the HIP challenge in Active HIP software to be executed by a computing device that requested the computing service;
a transmitter configured to provide the Active HIP software to the computing device that requested the computing service;
a receiver configured to receive a response to the Active HIP software; and
a determinator that resolves whether a response from a computing device comprises a correct solution for the HIP challenge and further determines that the response from the computing device comprises the correct Active HIP key, the correct Active HIP key being different from the correct solution for the HIP challenge, the determinator being configured to:
allow access to the computing service when the response to the Active HIP software comprises a correct solution for the HIP challenge, the correct Active HIP key, the correct Active HIP key being different from the correct solution for the HIP challenge, and information about the computing device that indicates the computing device is not attempting an unwarranted access to the computing service;
deny access to the computing service when the response to the Active HIP software does not comprise the correct solution for the HIP challenge;
deny access to the computing service when the response to the Active HIP software does not comprise the correct Active HIP key; and
deny access to the computing service when the response to the Active HIP software comprises information about the computing device that indicates that the computing device is attempting an unwarranted access to the computing service.

13. The system for implementing an Active HIP for protecting a computing service from unwarranted access of claim 12, wherein the pool of HIP challenges is a pool of two or more HIP images wherein each of the two or more HIP images is a string of two or more characters, and a response from a computing device comprises a correct solution for the HIP challenge when the response identifies the two or more characters, in their correct order, of the HIP challenge.

14. The system for implementing an Active HIP for protecting a computing service from unwarranted access of claim 12, wherein each of the collection of Active HIP key codelets, when executed, generates a bit with a value of zero or a bit with a value of one.

15. The system for implementing an Active HIP for protecting a computing service from unwarranted access of claim 14, wherein the collection of Active HIP key codelets is a collection of eighty codelets, forty of which Active HIP key codelets, when executed, generates a value of zero and the other forty of which Active HIP key codelets, when executed, generates a value of one, and wherein the set quantity of Active HIP key codelets is a set of forty Active HIP codelets randomly selected from the collection of eighty Active HIP codelets that, when executed, generates an Active HIP key of forty bits.

16. The system for implementing an Active HIP for protection a computing service from unwarranted access of claim 12 further comprising a collection of one or more Active HIP characteristic codelets from which collection a quantity of Active HIP characteristic codelets are randomly selected and, when executed, collect characteristics about a computing device.

17. A method for implementing an Active HIP, the method comprising:
randomly selecting a HIP challenge from a pool of two or more HIP challenges, the HIP challenge including an audio stream;

randomly selecting a set quantity of Active HIP key codelets from a collection of Active HIP key codelets, wherein each one of the set quantity of Active HIP key codelets, when executed, generates a bit with a value of zero or a bit with a value of one and a result of the execution of the set quantity of Active HIP key codelets is a correct Active HIP key;

conflating the HIP challenge with the set quantity of Active HIP key codelets in Active HIP software to be executed by a computing device;

providing the Active HIP software to the computing device;

receiving a response to the Active HIP software;

allowing access to the computing service when the response to the Active HIP software comprises a correct identification of the HIP challenge and the correct Active HIP key, the correct Active HIP key being different from the correct identification of the HIP challenge;

denying access to the computing service when the response to the Active HIP software does not comprise the correct identification of the HIP challenge;

denying access to the computing service when the response to the Active HIP software does not comprise an Active HIP key; and denying access to the computing service when the response to the Active HIP software does not comprise the correct Active HIP key.

18. The method for implementing an Active HIP of claim 17, wherein a HIP web page comprises the Active HIP software.

19. The method for implementing an Active HIP of claim 17, further comprising:

selecting a set quantity of Active HIP characteristic codelets from a collection of one or more Active HIP characteristic codelets, wherein the set quantity of Active HIP characteristic codelets, when executed, collects information about the computing device;

conflating the set quantity of Active HIP characteristic codelets with the set quantity of Active HIP key codelets of the Active HIP software; and receiving a response to the Active HIP software that comprises information collected by the Active HIP software when the set quantity of Active HIP characteristic codelets are executed, wherein the information collected by the Active HIP software comprises an IP address for the computing device.

20. The method for implementing an Active HIP of claim 17, wherein the HIP challenge is a first HIP challenge, the method further comprising:

randomly selecting a second HIP challenge from a pool of two or more HIP challenges; and including software in the Active HIP software that, when executed, replaces the second HIP challenge with the first HIP challenge.

\* \* \* \* \*